March 4, 1952 F. B. CLELAND ET AL 2,588,207
METHOD AND APPARATUS FOR MAKING TIRE PLY BANDS
Filed Feb. 23, 1949 7 Sheets-Sheet 1
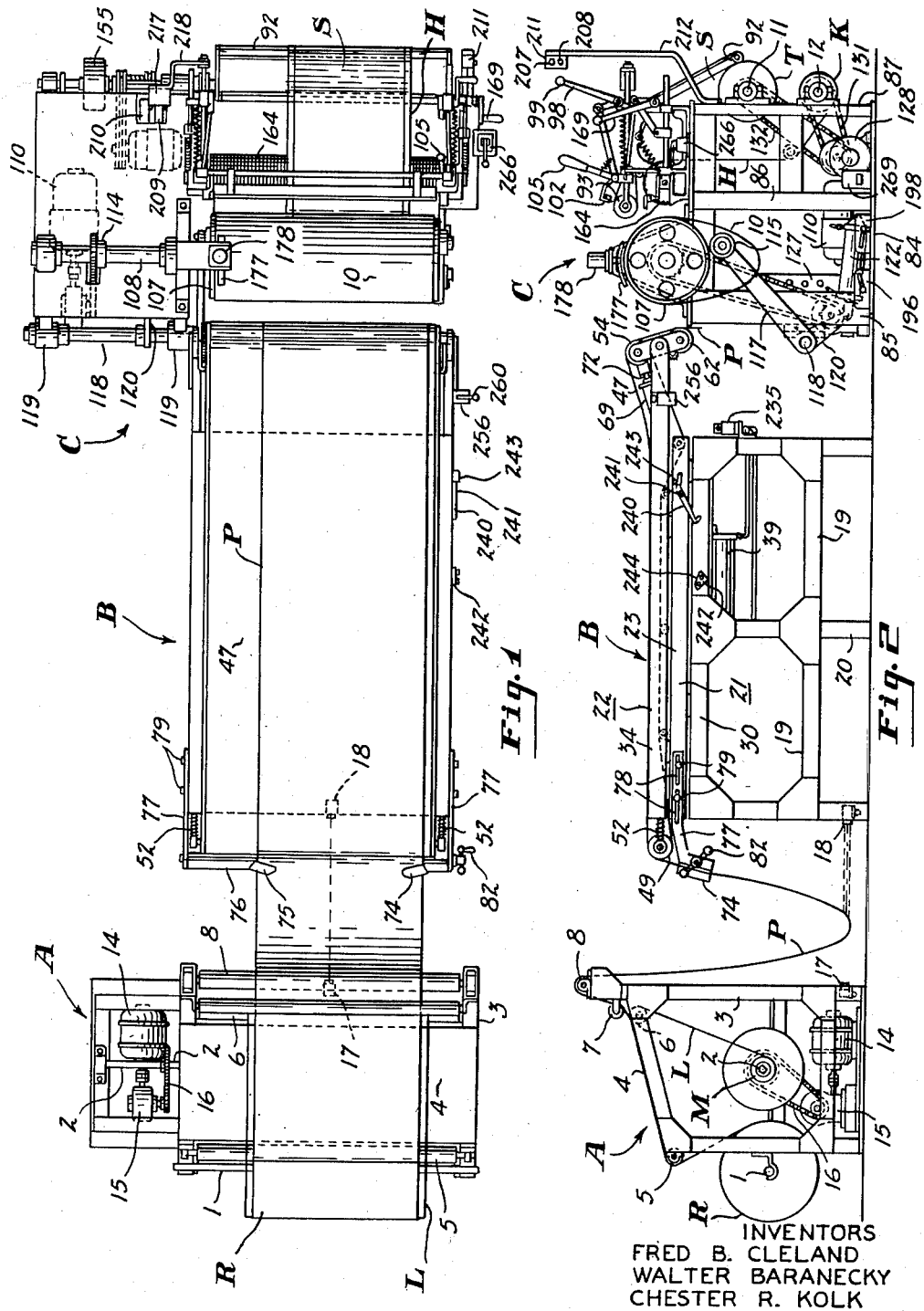
INVENTORS
FRED B. CLELAND
WALTER BARANECKY
CHESTER R. KOLK
PAUL E. WETZEL
BY Evans & McCoy
ATTORNEYS

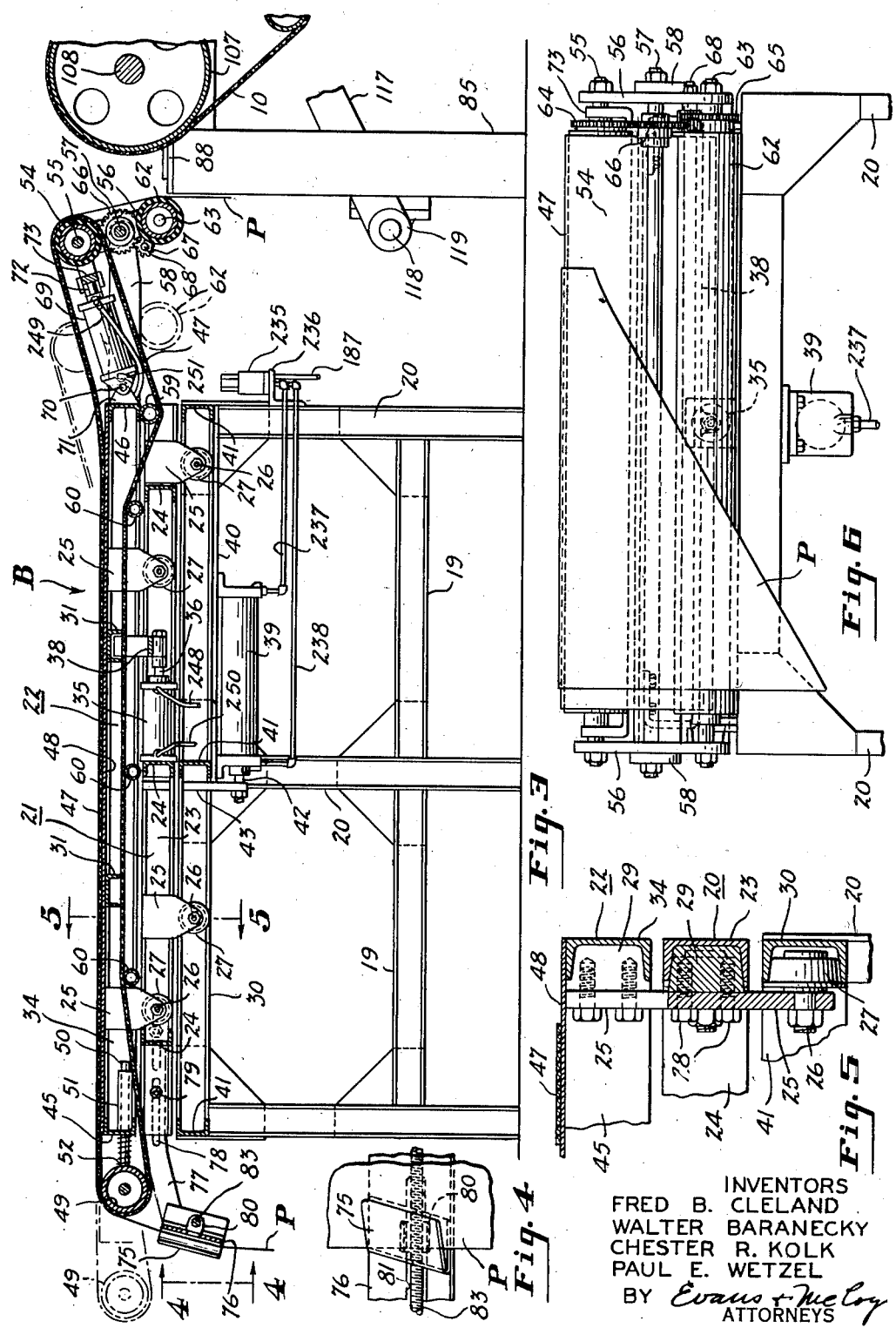

March 4, 1952 F. B. CLELAND ET AL 2,588,207
METHOD AND APPARATUS FOR MAKING TIRE PLY BANDS
Filed Feb. 23, 1949 7 Sheets-Sheet 3

INVENTORS
FRED B. CLELAND
WALTER BARANECKY
CHESTER R. KOLK
PAUL E. WETZEL
BY Evans & McCoy
ATTORNEYS March 4, 1952 F. B. CLELAND ET AL 2,588,207
METHOD AND APPARATUS FOR MAKING TIRE PLY BANDS
Filed Feb. 23, 1949 7 Sheets-Sheet 4
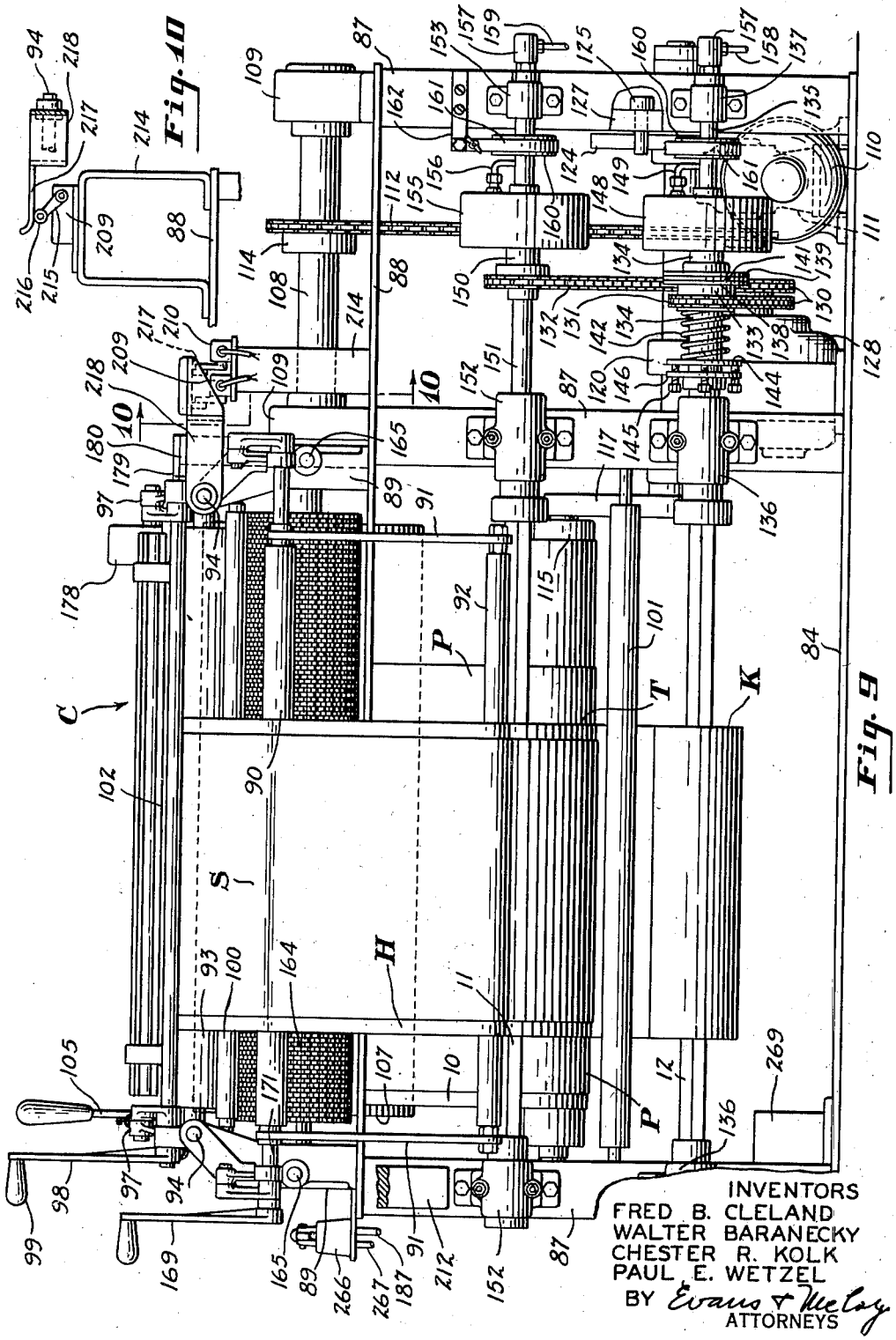
INVENTORS
FRED B. CLELAND
WALTER BARANECKY
CHESTER R. KOLK
PAUL E. WETZEL
BY Evans + McCoy
ATTORNEYS

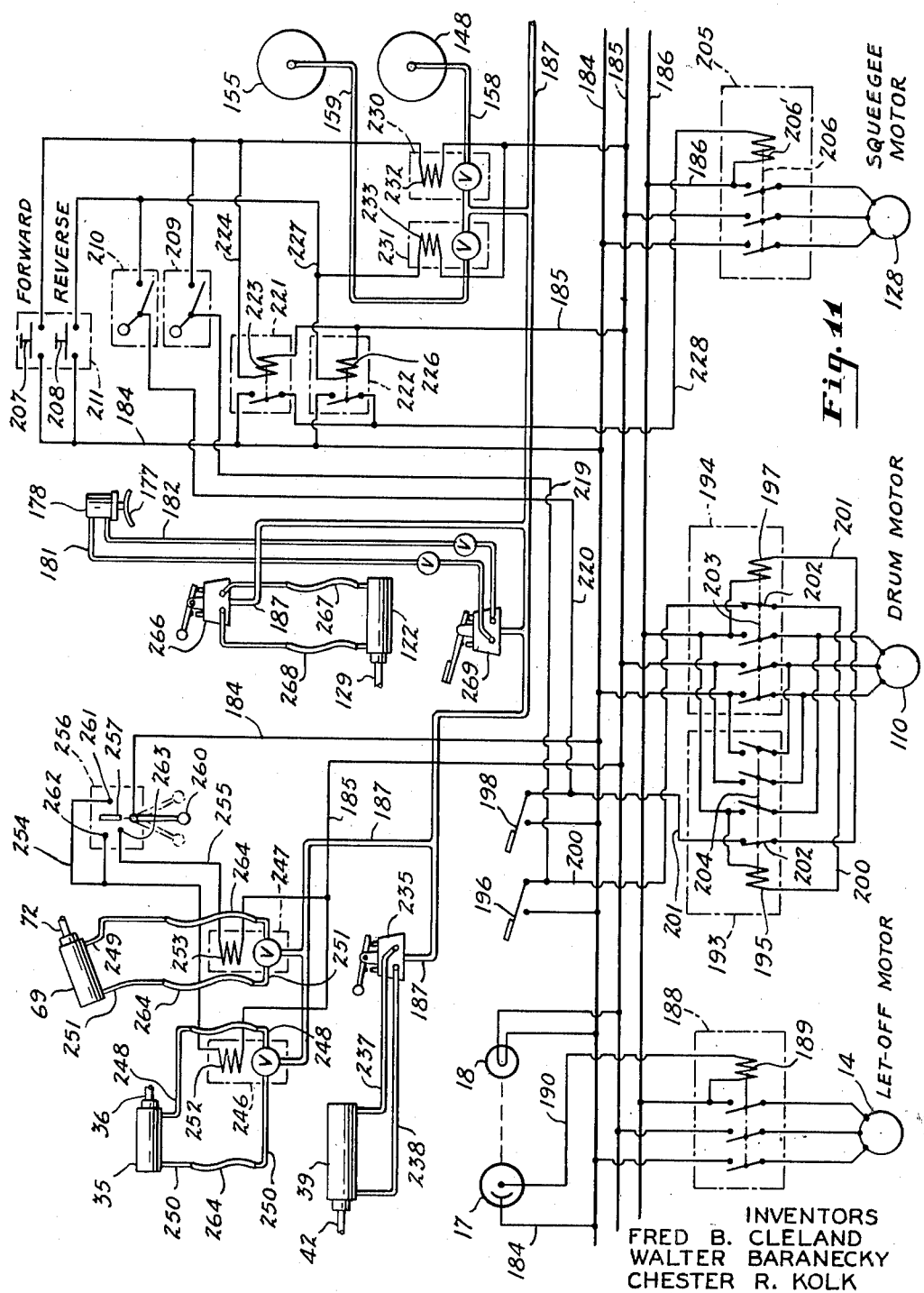

March 4, 1952    F. B. CLELAND ET AL    2,588,207
METHOD AND APPARATUS FOR MAKING TIRE PLY BANDS
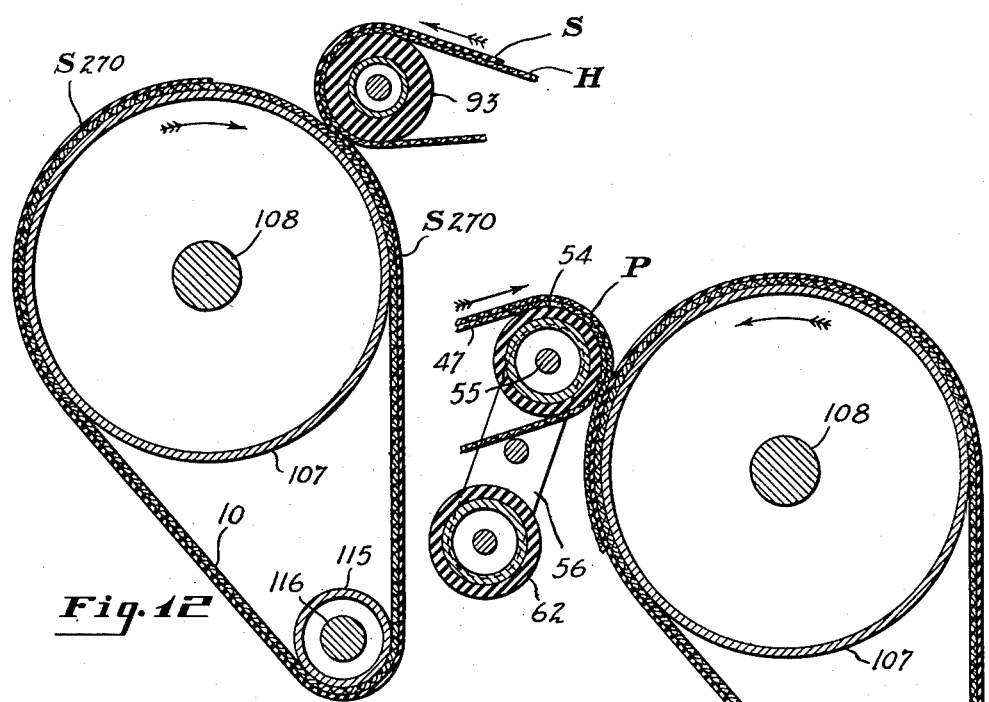
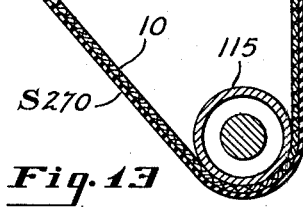
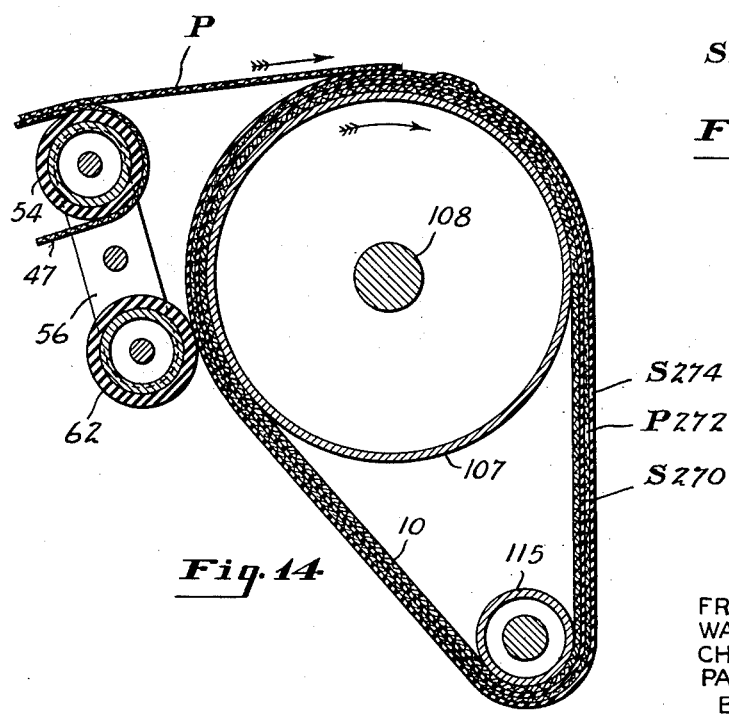
INVENTORS
FRED B. CLELAND
WALTER BARANECKY
CHESTER R. KOLK
PAUL E. WETZEL
BY Evans + McCoy
ATTORNEYS March 4, 1952  F. B. CLELAND ET AL  2,588,207
METHOD AND APPARATUS FOR MAKING TIRE PLY BANDS
Filed Feb. 23, 1949  7 Sheets-Sheet 7

INVENTORS
FRED B. CLELAND
WALTER BARANECKY
CHESTER R. KOLK
PAUL E. WETZEL
BY Evans & McCoy
ATTORNEYS Patented Mar. 4, 1952

2,588,207

UNITED STATES PATENT OFFICE 2,588,207

METHOD AND APPARATUS FOR MAKING TIRE PLY BANDS

Fred B. Cleland, Walter Baranecky, Chester R. Kolk, and Paul E. Wetzel, Akron, Ohio, assignors to The General Tire and Rubber Company, Akron, Ohio, a corporation of Ohio Application February 23, 1949, Serial No. 77,882

39 Claims. (Cl. 154—9)

This invention relates to a method of and an apparatus for forming fabric ply bands such as those used in the manufacture of pneumatic cord tires.

Pneumatic tire casings are made by placing a number of superposed layers of weftless cord fabric material about a form and wrapping the margins of the ply material about a pair of spaced parallel inextensible circular bead anchorages. Numerous process and form variations are used in the building up of tire bands or carcasses. It has been found advantageous and economical in most instances to separately prepare annular bands of the rubberized cord ply material apart from the actual building of tire casings on forms or drums. These prefabricated ply bands, flexible annuluses of predetermined length or size so as to fit about the intended building form or drum, are then furnished to the tire builder who places them about the circular building form.

Large or heavy duty tires such as those for trucks and busses incorporate a great number of plies, eight to twelve or more being not uncommon. In making tire casings of this character the tire builder places or lays up several ply bands, each of two or more layers or thicknesses of rubberized cord material, about the building form or drum one on top of another. The cord fabric material used, customarily of the bias cut weftless type in which the individual cords are disposed in parallel relation to one another and held in place by the sheet-like rubber material in which they are embedded, is supplied to the band builder in rolls as a continuous sheet or ribbon. The cords are diagonally disposed across the width of each ply band, the cords in successive layers of the ply material being arranged in opposite directions.

It is also customary to interpose thin layers or sheets of uncured gum rubber stock between the layers of the cord ply material in the bands. This gum rubber is supplied in rolls as a continuous sheet or ribbon referred to as "squeegee" stock, usually narrower than the width of the ply band. This squeegee stock augments the bulk of rubber provided about the center of the ply band body to fill between the cords.

The building of ply bands can be tedious and time consuming because of the difficulty of handling the bias cut cord ply material and the squeegee stock, all of which is in a tacky condition. Furthermore, the subsequent laying up of the cord ply bands on a tire building form or drum is difficult if the ply bands are not of the proper size to fit the drum or form on top of one another. Thus dimensional control as well as speed is an important factor in the making of ply bands. A number of machines and methods have been developed for manufacturing ply bands, the present invention being concerned principally with the type of apparatus shown generally in United States Patent 2,295,541.

One of the principal objects of the present invention is the general improvement of band building machines and methods so that an operator, working alone, with a minimum of training and skill, can quickly, easily, and safely make ply bands having uniform and predetermined dimensional and structural characteristics.

Another object of the invention is to provide a method of and apparatus for building bands which reduce the manual labor and effort required of the operator so that continuous operation through normal work periods is without objectionable fatigue and without serious danger.

Another object relates to the provision of greater flexibility of operation, permitting economical and rapid manufacture of bands constructed in accordance with different specifications. That is to say, the making in sequence of several series of two, three or any desired number of layers of cord ply material, separated, lined, covered, or not by one or more layers of gum rubber or squeegee stock, without delays or interruptions between each series for setting up the machine. As a particular aspect of this phase of the invention the building of ply bands having one or more layers of squeegee or gum rubber stock on the inside of the innermost layer of cord fabric material is facilitated.

The above and other objects are realized in a band building method employing a tensioned flexible carrier or belt, preferably of predetermined length and relatively inextensible, upon which the layers of cord material, squeegee or other stock, and chafer and breaker strips as desired, are laid up in any prescribed order. Separation of the built up band from the carrier belt is effected by releasing the tension in the latter and stripping or peeling the band therefrom.

A further object pertains to the assembling of squeegee or gum rubber stock with cord fabric material in an improved manner. In squeegee stock rolls the continuous ribbon or sheet of squeegee material is carried by a continuous liner of muslin or other cloth fabric which serves to separate the successive layers of the rubber stock and to support the squeegee sheet as the latter is carried into assembled relation with the cord ply material. The present band building machine employs a rotatable element such as a drum on which the cord fabric material is supported. The squeegee stock on the cloth liner is trained about a roller which is moved toward and against the cord fabric material on the drum so as to adhere them together. Driving forces are applied to both the building drum and the squeegee applying roller so as to minimize the frictional drive between the parts and thereby reduce slippage. A more precise and satisfactory placement of the squeegee stock about the band building drum or form is thus obtained. Driving the building drum or squeegee pressure roller by frictional engagement therebetween is minimized, avoiding objectionable slippage between the roller and drum which might result in improperly placed or distributed squeegee stock or in malfunctioning of the building machine.

Other objects and advantages, which will become apparent as the description proceeds, relate to details of construction and arrangements of parts contributing to economical manufacture and efficient operation of band building machines. This description is made in connection with the accompanying drawings forming a part of the specification. Like parts throughout the several views are indicated by the same letters and numerals of reference. In the drawings:

Figure 1 is a top or plan view of the band building apparatus;

Fig. 2 is a side elevational view of the apparatus;

Fig. 3 is a vertical sectional view taken longitudinally through a portion of the apparatus, showing the construction of the ply table unit, the let-off or supply table unit being omitted and parts of the builder unit being broken away and removed;

Fig. 4 is a fragmentary elevational detail, taken substantially along the line indicated at 4—4 of Fig. 3 and enlarged with respect to that view, showing the adjustable ply material guide;

Fig. 5 is a fragmentary sectional detail, taken substantially along the line indicated at 5—5 of Fig. 3 and enlarged with respect to that figure, showing the roller or wheel supports for the movable carriages of the ply table;

Fig. 6 is a fragmentary elevational view of the discharge end of the ply table unit showing the leading end of a strip of bias-cut ply material depending therefrom;

Fig. 9 is an elevational view, with parts broken away and removed, of one end of the builder unit showing the squeegee- applying and liner take-up rolls and the drive mechanism therefor;

Fig. 10 is a fragmentary elevational detail showing the mounting and actuating means for the electric limit switches that are used in electrically coupling the building drum drive and the squeegee roller drive;

Figures 15, 16:
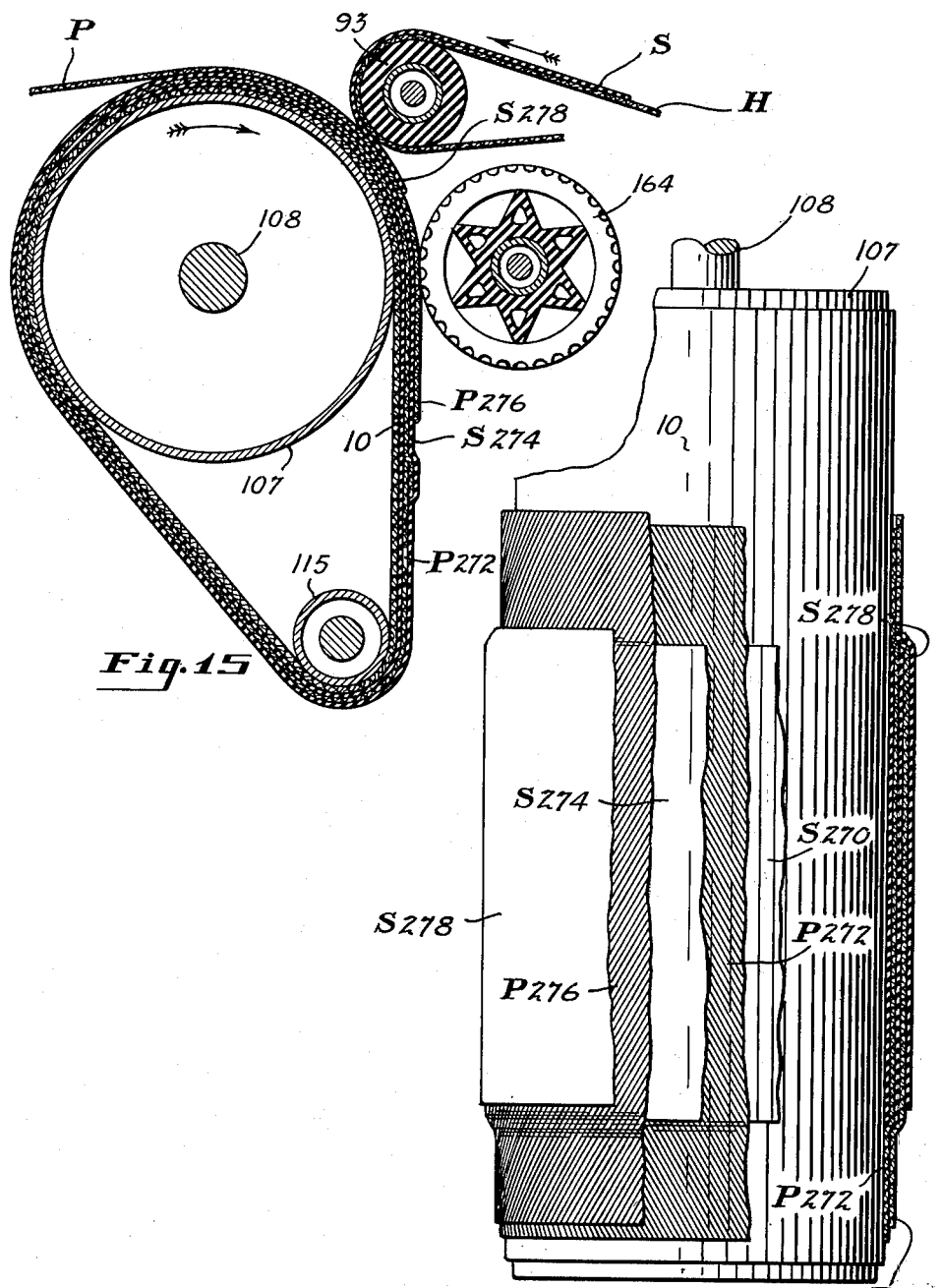

Fig. 11 is a combined electrical wiring and pneumatic tubing schematic diagram showing the governing controls; and Figs. 12 through 16 are diagrammatic views showing successive stages in the building of a multiple ply band using the apparatus and employing the method of the present invention, Figs. 12 through 15 representing vertical sectional details through the building drum, flexible carrier and related parts, and Fig. 16 representing a plan view of the building drum with the completed ply band broken away and removed in layers to show the relationships between the constituent parts thereof.

GENERAL

The band building apparatus of the present invention, briefly described, comprises three cooperative units or machines arranged in tandem (Figs. 1 and 2). Ply material is furnished to the apparatus in the form of a roll R which contains a continuous strip P of bias cut rubber embedded cords wound between the turns of a cloth liner L. The roll R is mounted on a spindle or shaft 1 of let-off or supply unit A for free turning about a horizontal axis. The liner L is separated from the ply material P in the let-off unit A and is wound on a take-up roll M secured on a driven horizontal square shaft 2 of the let-off unit. From the let-off A, the ply material strip P is carried onto the horizontally shiftable carriage of a ply-feeding table or unit B. The ply table B incorporates an endless belt which supports and acts as a feeder to advance the ply material strip P onto an endless flexible building carrier 10 of builder unit C. Squeegee stock in the form of a continuous thin strip S of uncured rubber is supplied in a roll T, the rubber squeegee being wrapped between the turns of cloth liner H. During the building process the liner is separated from the squeegee and wound on a take-up roll K. The squeegee supply and the take-up rolls T and K are mounted on square horizontal shafts 11 and 12, respectively, of the builder unit C.

Let-off unit

The let-off unit A comprises a supporting framework or structure 3 of metal elements having across its top an inclined apron or table top 4, providing a work surface on which to splice the trailing end of an expended ply material strip to the leading end of the succeeding or fresh strip. The ply material strip P and the liner L are drawn off the supply roll R and together are carried over an idler roller 5 and across the apron 4. Adjacent the upper edge of the apron, the liner L is trained over a horizontal idler roller 6 and thence downwardly to the take-up roll M on the square shaft 2. Adjacent the idler roller 6 the ply strip P is separated from the liner L and led upwardly under a first canvas covered horizontal idler roller 7 and thence over a second canvas covered horizontal roller 8. The ply material is suspended in a festoon between the roller 8 and the ply table B, the festoon rising and falling as the ply strip P is consumed and fed. To feed the ply material into the festoon, the square shaft 2 which carries the liner take-up roll M is driven by electric motor 14 connected through reduction gearing 15 and an endless V-belt 16.

The rollers 6 and 8, of equal diameter, are connected to turn in unison as by endless friction belts running over pulleys secured on their ends. Thus, as the roller 6 is turned by the action of the driven shaft 2 drawing the liner L thereover, the flexible belt connection between the rollers 6 and 8 turns the latter at the same linear speed. By reason of the frictional engagement between the ply strip P and the canvas covered surface of the roller 8, the latter draws the ply material away from the liner L and feeds the ply material into the festoon.

Controlling the operation of the motor 14 is a circuit which includes a photoelectric or light-responsive cell 17 mounted on the structure 3 of the let-off unit. A light source of lamp 18 mounted on the supporting structure of the ply table B is focused on the photocell 17. When the ply material strip is drawn out of the festoon for use, the light beam from the lamp 18 impinges on the photocell 17 and the latter acts to energize the electric motor 14 and start the ply material feed. As the motor 14 drives the take-up roll M and thereby feeds the ply strip P into the festoon, the latter descends across the path of the light beam. When the festoon interrupts the light beam, the photocell 17 deenergizes the electric motor 14, stopping the ply material feed.

*Ply feed table*

The ply feed table or unit B comprises a metal supporting structure having uprights 20 and cross braces 19 mounting primary and secondary carriages 21 and 22. The primary carriage comprises channel shaped side members 23 and similarly shaped cross members 24. The side members are disposed with their channels opening toward one another. The secondary carriage 22 comprises spaced parallel side members 34, intermediate cross members 31 and end cross members 45 and 46.

Depending from the carriage side members 23 and 34 are legs 25, the lower ends of which carry stub shafts 26 mounting flanged wheel 27. The legs 25 are secured as by cap screws 28 to blocks 29 received within the carriage channels and welded or otherwise secured in place. The wheels 27 of the primary carriage ride in channel-shaped side frame members 30 of the supporting structure 20. The secondary carriage wheels ride in the side frame channels 23 of the primary carriage. The carriage wheels 27 are spaced inwardly from the ends of the carriages, permitting longitudinal movement of the carriages with respect to one another and the supporting structure. Thus the supporting structure and the primary and secondary carriages, each comprising side and cross members of channel form, and of substantially the same over-all dimensions in plan form, are arranged so that the primary carriage may be moved or shifted longitudinally with respect to the supporting structure and the secondary carriage may be moved or shifted longitudinally with respect to the primary carriage.

The shifting of the secondary carriage on the primary carriage is effected by a pneumatically actuated double-acting piston and cylinder combination indicated at 35. One end of the air cylinder is secured to one of the cross members 24 of the primary carriage, piston rod 36 being secured to a yoke 38 depending from and secured to one of the secondary carriage cross members 31. Another cylinder and piston combination 39 is secured to a plate 40 supported between cross members 41 of the supporting structure. A double-acting piston within the cylinder is connected by piston rod 42 to a depending member 43 secured to one of the primary carriage cross frame members 24. As will later appear, the control system governing the supply of air to the cylinders 35 and 39 is arranged to maintain air on the rod sides of the pistons so that the latter are retracted in the air cylinders to retain the carriages in the positions shown in Figs. 1–3.

Ply material is advanced longitudinally across the top of the secondary carriage 22 by an endless fabric belt 47. The upper run of this belt travels over and is supported by a sheet metal apron 48 secured on the carriage cross members 31, 45 and 46. At the receiving end of the carriage the belt 47 is trained around a cylindrical rotatable member 49 on a horizontal shaft carried between the ends of rods 50 slidable longitudinally in guides 51 welded or otherwise secured to the insides of the carriage side members 34. The rods 50 project through apertures provided therefor in the carriage cross member 45, and helical coil compression springs 52 acting between the carriage end member and the enlarged journal ends of the rods 50 press the roller 49 away from the carriage end to maintain tension in the belt 47.

At the other or discharge end of the secondary carriage, the endless belt is trained around a rubber-covered roller 54 rotatable on a shaft 55 supported horizontally between the upper ends of pivoted supports 56. These support members are tiltably mounted intermediate their ends on a cross rod 57 supported between the ends of extensions 58 of the carriage side members 34. From the underside of the roller 54, the return or lower run of the endless canvas belt 47 passes under a relatively small idler roller 59 mounted beneath the forward cross member 46 of the secondary carriage and thence over the tops of idler rollers 60 disposed at spaced intervals along the length of the carriage and mounted transversely of the latter. The idlers 60 train the belt run over a path above the level of the actuating air cylinder 35, the belt path being between the arms of the yoke 38.

Between the lower ends of the pivoted support members 56 is mounted a rubber-covered cylindrical roller 62 preferably of the same size or diameter as the belt-supporting roller 54. The roller 62 is rotatable on a shaft 63, the ends of which are secured in the tiltable members 56. Gears 64 and 65, secured on the adjacent ends of the rollers 54 and 62, respectively, are connected by idler gears 66 and 67 to effect simultaneous rotation of the rollers in opposite directions. The idler gear 66 is journalled on the cross rod 57, the idler 67 on a stub shaft 68 supported in one of the pivoted members 56.

The synchronous drive rollers 54 and 62 and the supporting and rotating means associated therewith comprise a shiftable operating head on the secondary carriage. To tilt the pivoted support members 56, and thereby swing the rollers 54 and 62 back and forth, an air actuatable cylinder and piston combination 69 is mounted between the runs of the endless belt 47 and is connected to the carriage and to the upper ends of the tiltable support members. One end of the air cylinder is supported on a pivot pin 70 carried by a bracket 71 in the center of the carriage cross member 46. The air cylinder piston, double-acting, is secured on a rod 72, the outer end of which is secured to a yoke 73 spanning the roller 54 and having ends loosely received on the upper cross shaft 55.

The ply material strip P as it is drawn onto the secondary carriage of the table B by the movement of the endless belt is trained between V-shaped edge guides 74 and 75. These guides, formed as by folding metal plates or sheets to an acute angle, are mounted on a cross member 76 supported between the ends of side extensions 77 of the primary carriage. The extensions 77 are formed with elongated slots 78 which receive cap screws 79 threaded into the side members 23 of the primary carriage, permitting adjustment of the guide-supporting member 76 to different distances from the end of the carriage. The guide 74 is mounted in fixed position on the support 76 adjacent the operator's side of the machine, it being customary to operate the apparatus with the ply material strip P as close to the operator's side as possible for the sake of convenience.

To accommodate ply material strips of different widths the edge guide 75 is adjustable along the length of the support 76. This adjustment is provided by a threaded rod 83 journalled at its ends in the side extension 77 and turned by a handcrank 82. The rod 83 which parallels the support member 76, engages a nut 80 guided in slot 81 (Fig. 4) and secured to the guide 75. Rotation of the threaded rod 83 operates to shift the guide 75 back and forth along the support 76, the rod 83 being held in its journals against axial shifting movement. The guides 74 and 75 are so arranged that the closed or folded edges thereof are disposed at an acute angle to the edges of the ply material P. The tapering opening into each of the guides, in combination with the positioning of the folded edges thereof at an acute angle to the ply material path, results in a smoothing action on the moving ply material edges and an effective lateral shifting of offset ply material to guide the latter into predetermined position on the endless belt 47.

Builder

The building unit C is located at the discharge end of the ply table B adjacent the tiltable drive head of the latter. The builder comprises a supporting structure or frame which is L-shaped in plan form and includes an iron or steel plate base 84 and sets of uprights 85, 86 and 87. The uprights 87 carry journals for the shafts that mount the squeegee supply and take-up rolls T and K, previously mentioned above in the general description.

Surmounting the uprights is an L-shaped metal table plate 88 on which is supported squeegee applying apparatus which may correspond to that disclosed in Patent 2,295,541. It includes cast metal frame members 89 mounting a horizontal guide roller 90 over which the liner H carrying the squeegee S is drawn from the roll T. A pair of swinging arms 91 journal a roller 92 between their ends, the arms 91 being supported for free swinging movement about the axis of the guide roller 90. The arms 91 are of such length that the roller 92 rests by gravity on the squeegee roll T, the stock passing under the roller 92 and over the roller 90 to a horizontal pressure roller 93 by means of which the stock is applied to the substantially inextensible carrier belt 10 on the building drum.

The roller 93 is mounted for horizontal movement into and out of drum engaging position, being journaled between the forward ends of parallel bars 94 which are mounted to slide in bearings 96 in the frame members 89. Brackets 95 are fixed to the bars 94 on the outside of the bearings 96, these brackets being connected by links 97 to arms secured on a cross rod carrying a lever 98, the rod being pivoted on the frame adjacent one of the rear bearings 96. The squeegee stock, drawn from the roll T over the rollers 90 and 92 and led over the top of the roller 93, is transferred to the carrier belt 10 or ply stock thereon. The fabric liner is carried from the underside of the roller 93 across guide rollers 100 and 101 to the wind up roll or roller K.

To sever the squeegee stock after a desired length thereof has been thus applied to the carrier band or ply material, an electrically heated knife 102, supported on a rock shaft 104 journaled in the brackets 95, is moved or operated by a lever 105 fixed to the shaft. The knife 102 is supported above and in parallel relation to the roller 93 so that it can be swung down into engagement with the sheet of rubber squeegee stock trained about the roller. A spring 106 attached to the lever 105 normally holds the knife 102 in elevated position out of contact with the squeegee stock.

The flexible canvas belt or endless carrier 10 is supported on a cylindrical building drum 107 disposed in the angle of the supporting structure of the builder. The drum is secured on a horizontal shaft 108 that turns in journals 109 secured to the top of the table plate 88 and is driven alternatively in either direction by a reversible electric motor 110 secured to the base plate 84. This motor is connected to a speed reducer 111 through a flexible coupling, the outlet shaft of the speed reducer carrying a sprocket about which is trained a chain 112 also trained over a sprocket 114 secured on the drum shaft 108.

A tensioning roller 115 is received within the loop of the flexible carrier 10 and draws the latter snugly about the drum 107. The roller is mounted horizontally below the drum and in parallel relation thereto on a shaft 116 supported cantilever fashion in the end of a swinging arm 117 secured on a shaft 118 mounted to turn in brackets 119 secured to the uprights 85 of the supporting structure. Also secured on the shaft 118 and depending therefrom is an arm 120, the lower end of which is connected at 121 to the piston rod of a double-acting pneumatic piston and cylinder assembly 122. The cylinder is pivotally mounted at 123 to a bracket secured to the base plate 84. Introduction of air into the left end (Fig. 7) of the pneumatic cylinder assembly 122 draws the piston rod into the cylinder thereby raising the arm 117 and the tensioning roller 115. Introduction of air into the opposite or right hand end of the cylinder acts through the lever and shaft to draw the arm 117 downwardly and to tension the carrier 10 by means of the roller 115.

The carrier 10 shown is used alternatively to other carriers similarly constructed of canvas or light flexible material, the several carriers being of different lengths so that tire ply bands of different circumferential extent can be built. The canvas belts, though substantially inextensible, are subject to growth under long continued conditions of high stress or tension. Accordingly they are held substantially to predetermined lengths by limiting the distance between the rotational axes of the building drum 107 and the smaller tensioning roller 115. Control of this spacing is effected by limiting the downward movement of the arm 117. One suitable means for positioning the tension roller 115 in predetermind spaced relation with respect to the drum 107 comprises an arm 124 secured on the shaft 118 to turn with the latter. This arm is engageable with a pin 125 which is receivable in one of a number of holes 126 formed in an upright 127 supported on the base plate 84 adjacent the path of the arm 124. The upright 127 may be steadied by welding the same to one of the machine uprights 85.

During the band building processes the endless canvas band or carrier 10 is tensioned around the drum 107 and roller 115 by the downward force exerted on the roller 115 by gravity and also by the pneumatic assembly 122. The downward movement of the roller 115 is limited by engagement of the arm 124 against the pin 125 so that, after initial stretching of a new carrier 10 to the desired predetermined size, objectionable stretching beyond the predetermined band size is avoided and the bands built on the machine are of uniform size.

In the building of ply bands it is desirable that the operator be able accurately to control the application of the squeegee stock S to the building drum or carrier. The apparatus of the present invention provides for positive control of the squeegee stock by an arrangement which includes in combination an improved selective drive for operating alternatively either the shaft 12 which carries the liner take-up roll K or the shaft 11 which carries the squeegee supply roll T. The combination also includes a companion drive arrangement whereby power is applied simultaneously to the building drum or carrier and to the squeegee advancing means so that frictional drag is minimized between the building drum or the carrier and the squeegee applying roller 93.

Power for forward and reverse drive of the squeegee liner H is derived from an electric motor 128 secured to the base plate 84. This motor incorporates a speed reducer having an output shaft on which are secured a pair of drive sprockets 130 carrying drive chains 131 and 132. The drive chain 131 is trained around a sprocket secured on a circular collar 133 rotatably mounted on a cylindrical quill 134 in turn rotatable on a horizontal shaft 135. This shaft is rotatable in spaced bearings 136 and 137 secured to a pair of the frame uprights 87. The collar 133 has a circular disc 138 on one end which drives a similar disc 139 secured against rotation on the quill 134. A friction disc 141 may be interposed between the driving and driven discs 138 and 139, these parts constituting a friction drive and overload release held together by a helical coil spring 142 compressed between the collar 133 and a circular washer 144 carried on the sleeve or quill 134. The compression in the spring 142 and the torque transmitting capacity of the friction drive are adjusted by means of circumferentially spaced bolts 145 threaded through a second circular disc 146 secured on the quill 134. Suitable means such as locking collars hold the quill 134 against axial shifting movement on the shaft 135.

On the shaft 135 at one end of the quill 134 is a torque transmitting clutch 148 of conventional construction. This clutch is actuatable by pneumatic pressure supplied, as will be later described, through a flexible conduit 149. One component of the clutch comprises a cylindrical drum keyed or otherwise secured against rotation on the end of the quill 134. The other component of the clutch 148 is secured on the shaft 135 to drive the latter when the clutch is engaged. The shaft 135 corresponds to the shaft 54 of the apparatus shown in United States Patent 2,295,541, driving the liner take-up shaft 12 (which is removable) through a conventional square socket and sliding collar assembly.

The drive chain 132 is trained about a sprocket secured on a sleeve 150 rotatable on shaft 151 journaled horizontally in bearings 152 and 153 attached to the frame uprights 87 above the journals 136 and 137 for the take-up drive shaft 135. The sleeve 150, suitably restrained against axial movement on the shaft 151, mounts, in non-rotative relation, the outer or drum component of a pneumatic clutch 155 similar to the pneumatic clutch 148. The other component of the clutch 155 is secured on the shaft 151 to drive the latter when the clutch is energized by pneumatic or air pressure introduced through conduit 156. To supply air to the clutches 148 and 155 the shafts 135 and 151 are formed with axial bores in their right hand ends (Fig. 9), the flexible conduits 149 and 156 being connected to the axial bores through suitable radial passages. On the ends of the shafts 135 and 151 which project beyond the journals 137 and 153 are secured rotatable pneumatic couplings 157 which connect air supply conduits 158 and 159 to the axial bores in the shafts 135 and 151 respectively.

Figures 7, 8:
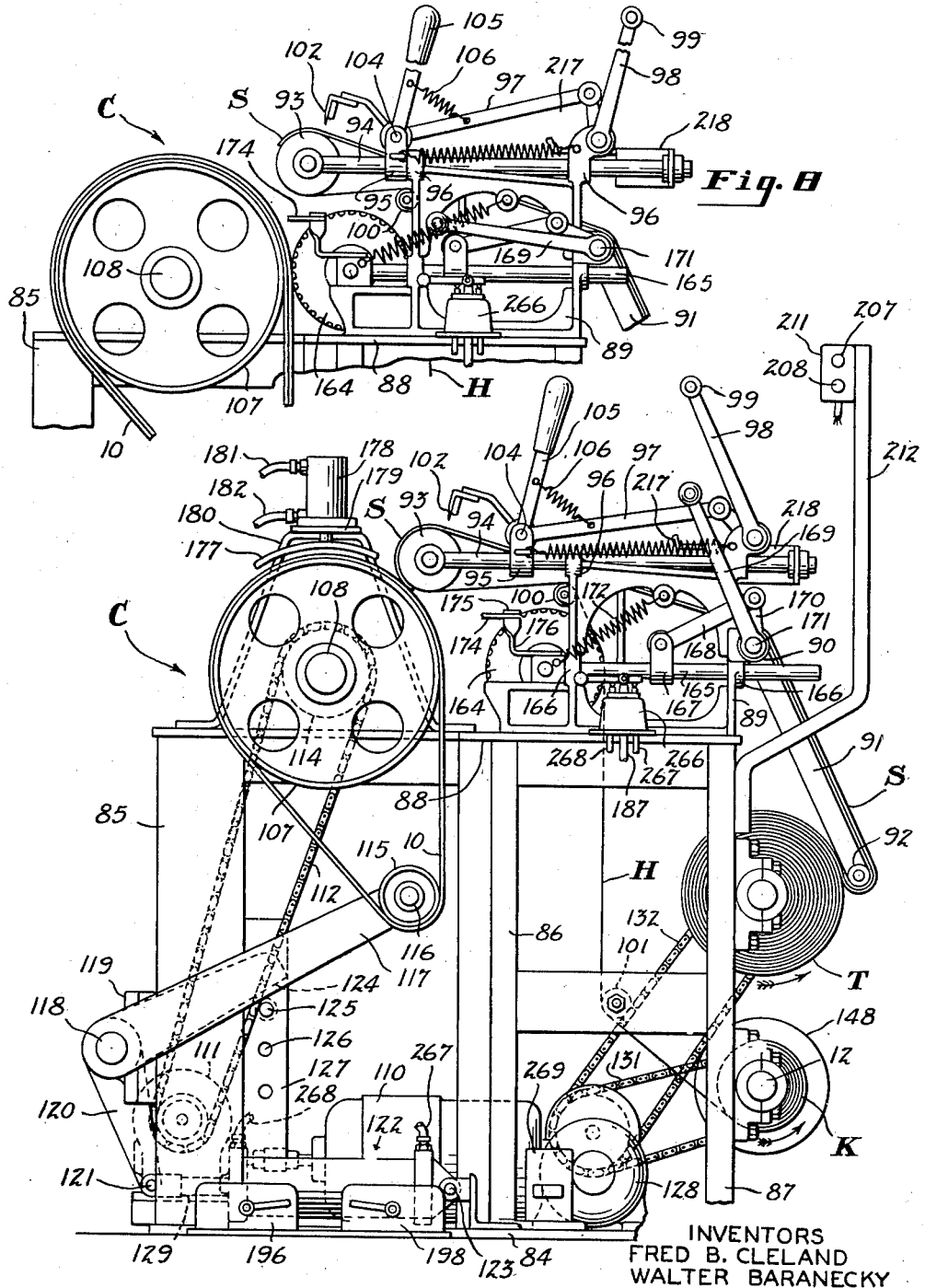
Fig. 7 is a side elevational view of the builder unit, with parts broken away and removed, showing the cushion-rubber or squeegee-applying roller advanced against the flexible carrier on the building drum.
Fig. 8 is a fragmentary elevational view, similar to Fig. 7, showing the squeegee roller retracted and the stitching or pressure roller advanced against the building drum.

As viewed in Fig. 7, the squeegee drive motor 128, acting through the drive mechanism clutch 148, turns the liner take-up shaft 12 in a counter-clockwise direction to draw the liner H and squeegee stock S off the supply roll T and feed it around the squeegee applying roller 93. Alternatively, operating through the clutch 155, the drive motor 128 turns the shaft 11 in a counter-clockwise direction to retract the liner and squeegee and withdraw squeegee from the applying roller 93. Overrunning of the shafts 135 and 151 when their respective pneumatic clutches are disconnected is prevented by band type friction brakes comprising drums 160 secured on the shafts and adjustable friction bands 161 carried by arms 162 secured to one of the frame uprights 87. Thus the liner H is kept taut.

Beneath the squeegee applying roller 93 and parallel thereto is disposed a horizontal pressure or stitching roller 164. This roller is supported between and journaled on the ends of horizontal slide bars 165 mounted in bearings 166 provided in the frame members 89. Brackets 167 are secured to the slide bars 165 and are connected by links 168 to levers 170 secured on a cross rod or shaft 171 to which an arm 169 is also secured. This cross shaft also supports the guide roller 90 and the swinging arms 91. Springs 172 connected between the forward ends of the slide bars 165 and the frame members 89 normally hold the stitching roller 164 retracted. As described in the prior patent referred to, the stitching roller is formed with a yielding peripheral portion so that under pressure it conforms to the surface of rubber stock and ply materials laid up on the carrier 10, thus serving to firmly unite superposed layers of band building materials.

Across the upper part of the stitching roller 164, parallel and adjacent to the surface thereof, is a safety strip 174 of yieldable material such as rubber or belting. This strip, supported as by being clamped between metal cross members 175 extending between brackets 176 secured to the forward ends of the slide bars 165, is disposed in the bight between the building drum 107 and the stitching roller 164 when the latter is advanced as in Fig. 8. Thus the yieldable strip 174 functions as a guard and warning to prevent the operator's hand being drawn between the drum and the stitching roller.

After a ply band has been built on the carrier 10 the latter is clamped to the drum 107 by a shoe 177 which holds the flexible carrier in place so that the built up ply band can be stripped away or separated. The shoe 177, arcuately curved to the contour of the drum surface, is secured to the end of the piston rod of a pneumatic cylinder assembly 178 comprising a double-acting piston. The cylinder assembly is supported above the far end of the drum 107 on a horizontal arm 179 carried by a two-legged bracket 180. This bracket straddles the drum shaft 108 and is secured as by welding to the upper surface of the table plate 88. Air is introduced into the upper end of the pneumatic cylinder 178 through a conduit 181 for the purpose of forcing the piston downwardly and moving the shoe 177 against the drum 107. To retract the shoe and hold the latter in raised position, air under pressure is introduced into the lower end of the cylinder 178 through a conduit 182.

CONTROL

The band building apparatus of this invention is so arranged and laid out and provided with such controls that it can be readily and safely operated by relatively unskilled labor with a minimum of fatigue. The electrical wiring relays, solenoids, and related controls and also the pneumatic valves, tubing, conduits and supply are conventional in character. Except as specifically referred to herein and shown in detail on the drawings, the various control components are represented in merely diagrammatic form in Fig. 11. In this diagram, which combines both the electrical and the pneumatic components, the electrical power supply is represented as a three phase line comprising conductors 184, 185 and 186, and the supply of air under pressure from a suitable source, not shown, is received through conductor 187 having several branches.

Operation of the let-off motor 14 is controlled by a relay switch 188 having an armature operated by a solenoid coil 189 governed by the photocell 17 to one terminal of which it is connected by electrical conductor 190. The other terminal of the photocell is connected to the line conductor 184. The solenoid is also connected to line conductor 186 through the switch. The light source 18 for use with the photocell 17 in governing the let-off motor is connected to line conductors 184 and 185.

The drum drive motor 110 is reversible and is connected to the three phase line through a solenoid actuated switch 193 for operation in forward direction to turn the drum 107 clockwise as viewed in Figs. 7 and 8. Reverse rotation of the drum, or counter-clockwise turning, as viewed in the same figures, is effected by energization of the motor 110 through a solenoid actuated switch 194. Energization of operating solenoid 195 of the switch 193 is governed by a foot operated switch 196 which may be located on the floor of the shop adjacent or on the machine base 84 and below the building drum.

The reverse switch 194 is operated by a solenoid 197 governed by a foot-actuated switch 198 which also may be located on the shop floor adjacent the switch 196. Conductors 200 and 201, which connect the solenoids 195 and 197 to the switches 196 and 198, respectively, include safety interlock switches 202. The interlock switch governing the forward drive switch 193 is carried on armature 203 of the reverse switch 194, and the interlock switch in the solenoid circuit of the reverse drive switch 194 is carried on armature 204 of forward drive switch 193. Thus, closing of the foot switch 196 energizes the solenoid 195 of the forward drive control switch 193 to shift the armature 204 and close the contacts which connect the windings of motor 110 to the conductors 184, 185 and 186 of the electric current supply line for forward drive energization. The switch 196 and the armature 204 of the switch 193 are spring-loaded so that the circuits open when the operator removes his foot; accordingly, forward drive of the drum occurs only so long as the operator maintains pressure on the foot switch 196. The reverse drive control switch 198 and the armature 203 of the switch 194 are also spring-loaded, so that reverse drive of the drum motor 110 and the drum occurs only so long as the piston maintains pressure on the foot switch 198. The armatures of all of the other electrical switches are likewise spring-loaded so that, upon de-energization of the actuating solenoids, the respective circuits are broken by opening of the switch contacts.

The squeegee drive motor 128 is connected to the electrical conductors 184, 185 and 186 through a control switch 205 having a solenoid actuated spring-loaded armature 206 which, when energized, is arranged to close the contacts and supply electric current to the motor. Energization of solenoid 206' of the switch is subject to a dual control which includes manually actuatable forward and reverse button switches 207 and 208, respectively, and also the previously mentioned foot switches 196 and 198, the latter being respectively tied into the squeegee motor circuit through limit switches 209 and 210.

The manual switches 207 and 208 are contained in a box 211 supported on an upright post 212 secured to one of the frame uprights 87. These manual switches are so disposed as to be adjacent handle 99 of the lever 98 when the latter is at its extreme limit of movement (Fig. 2) in which the squeegee applying roller 93 is retracted. During operation of the apparatus in the building of ply bands, manual control of the squeegee motor 128 normally occurs only when the squeegee applying roller 93 is retracted from the building drum 107. When so retracted, the handle 99 of the lever which advances and retracts the roller serves as a rest for the operator's hand and the operator can locate the manual control buttons 207 and 208 without visual aid, permitting him to maintain close observation of the band building process.

The limit switches 209 and 210 are located in boxes carried on a platform suported by a bracket 214 mounted on the table plate 83 of the supporting structure. Each of the limit switches has a pivotally mounted actuating arm 215, the end of which carries a roller 216 that is engaged and depressed by a cam plate 217 movable with the slide bars 94 that carry the squeegee roller 93. The cam plate 217 is supported in horizontal position by arm 218 that extends laterally from the rear end of one of the slide bars 94. Desirably, the leading edge of the cam plate 217 is curved upwardly (Fig. 10) so as to ride over the rollers 216 on the limit switch arms. In the retracted position of the slide bars 94 (Figs. 1, 2 and 8), the cam plate 217 is withdrawn from the rollers 216 of the limit switches and the latter, being spring-loaded or biased normally to remain open, interrupt the circuits therethrough. When the slide bars 94 are advanced by movement of the lever 98 to the position shown in Fig. 7, bringing the squeegee applying roller 93 against the drum 107, the cam plate 217 is advanced against the switch rollers 216 to turn the switch arms 215 and close the limit switches 209 and 210. Thus when the squeegee applying roller 93 is advanced against the building drum the circuit of the squeegee motor 128 is tied to the foot switches 196 and 198 by the closed limit switches 209 and 210 through electrical conductors 219 and 220, respectively. A parallel arrangement for synchronously and simultaneously actuating both the drum drive motor 110 and the squeegee drive motor 128 is thus provided.

Although the manual switches 207 and 208 and the limit switches 209 and 210 can be directly connected to the squeegee motor control switch 205, it is preferable to employ solenoid actuated relay switches 221 and 222. Electromagnetic or solenoid coil 223 of the relay 221 is connected by wire conductor 224 to the manual forward drive control button 207 and to the limit switch 209. Solenoid or electromagnetic coil 226 of the relay 222 is connected by wire 227 to the manual reverse control button 208 and to the limit switch 210. The other terminals of the solenoid or armature actuating coils 223 and 226 are connected to the main line conductor 185. These solenoid coils actuate armatures which carry the usual relay contacts. The switches 221 and 222 are arranged in parallel relation between the main line conductor 184 and the solenoid 206' of the squeegee motor control switch 205, being connected to the latter by an electrical wire 228. The solenoid 206' is also connected to main line conductor 186. Thus, by the parallel arrangement of the relays 221 and 222 the electrical circuit for energizing the squeegee motor 128 is closed by operating either the manual forward control button 207 or the manual reverse control button 208. Likewise, when the squeegee pressure roller 93 is advanced against the drum 107, so that the limit switches 209 and 210 are closed, the squeegee motor 128 is energized upon depressing either the forward control foot switch 196 or the reverse control foot switch 198. As previously described, the driving connection between the motor 128 and the squeegee carrier or liner H is effected in a forward direction by means of the fluid-actuated clutch 148 interposed between the motor and the square shaft 12, which carries the take-up roll K. Reverse drive of the squeegee liner is effected through the pneumatic clutch 155 interposed between the motor 128 and the square shaft 11 carrying the squeegee supply roller T.

Control of the pneumatic clutches 148 and 155 is through spring-loaded electromagnetic or solenoid actuated three-way valves 230 and 231, respectively. The valve 230 receives high pressure air or other pneumatic fluid from the supply conduit 187 and, in response to energization of solenoid 232, opens to feed the fluid into the conduit 158 which carries the air or fluid to the clutch 148. Similarly, the valve 231 is connected to the fluid supply conduit 187 and is arranged upon energization of its electromagnetic or solenoid coil 233 to admit high pressure fluid to the conduit 159 which carries the same to the clutch 155. The valves 230 and 231, spring-loaded, remain open only during energization of their respective solenoid coils, and close instantly upon de-energization thereof. In closed position, each valve exhausts the pneumatic fluid from its respective clutch to interrupt the driving connection. One terminal of each of the solenoids 232 and 233 is connected to the main line conductor 185, the other terminals of the solenoids being connected to the respective forward and reverse drive control switches, i. e. the solenoid or electromagnetic coil 232 is connected to the electrical conductor 227 of the manual reverse control button 208 and the solenoid coil 233 is connected to the electrical conductor 224 of the manual forward control button 207.

Bodily shifting movement or withdrawal of the primary carriage 21, carrying with it the secondary carriage 22, is effected by introducing air or other pneumatic fluid into the right-hand end of the cylinder assembly 39 (Figs. 2 and 3) forcing the piston rod 42 out of the cylinder. This moves the primary carriage to the left on the rollers 27, the limit of movement being suitably determined as by abutments or stops, not shown, or by the piston reaching its limit of travel in the air cylinder. The high pressure air or pneumatic fluid for thus effecting primary carriage movement is governed by a four-way two-position manually controlled pneumatic valve 235 supported on a bracket 236 carried across the uprights 20 at the end of the ply feed unit B adjacent the operator's station and connected to the fluid supply conduit 187. In one position the valve feeds high pressure air or other pneumatic fluid into the right-hand end of the air cylinder 39 through tube or conductor 237, air from the left hand end of the air cylinder returning to the valve through conduit or tube 238 and exhausting to the atmosphere. In its other position the valve 235 feeds high pressure air or pneumatic fluid from the supply conduit 187 into the left hand end of the cylinder through the tube or conduit 238, air from the right hand end of the cylinder returning through the conductor 237 and exhausting to the atmosphere.

When the primary and secondary carriages are retracted, permitting the operator to enter between the tilting head or the rollers 54 and 62 of the ply table B and the building drum 107, a safety latch 240 pivoted on a shoulder bolt 241 screwed into one of the side members 23 of the carriage engages behind a detent 242 secured to one of the side frame members 30 of the table. A stop 243 carried by the primary carriage side member is engaged by the latch 240 to limit the downward swinging movement of the latter so that during retraction of the carriage the hooked end of the latch rides over curved cam surface 244 of the detent 242 to drop behind the latter as the carriage reaches its limit of movement. The latch and detent prevent inadvertent forward movement of the carriages should the valve 235 be stripped or shifted while the operator is between the ply table and the building drum 107.

In shifting the secondary carriage 22 into operative position with respect to the building drum 107 it is desired also to bring either the top feed roller 54 or the bottom feed roller 62 to bear against the building drum. The supply of air or other pneumatic fluid to the actuating cylinder assemblies 35 and 69 is governed by four-way valves 246 and 247. These valves connect the high pressure supply conduit 187 to the left ends of the cylinders through conductors or tubes 250 and 251, respectively, and are spring-loaded normally to maintain the connections between the supply conduit and the branch conduits 250 and 251, so that the carriages and the tilting head are held in the relative positions shown in Figs. 1 and 2. Conduits 248 and 249 connect the valves to the right ends of the cylinder assemblies 35 and 69, respectively, being vented to the atmosphere through the valves and serving as return conduits. Solenoid coil 252 of the valve 246 and solenoid coil 253 of the valve 247 are connected by electrical conductors 254 and 255, respectively, to contacts in a three-position electrical switch 256. Armature 257 of this switch is connected to conductor 184 of the main power supply line. The other terminals of the valve solenoids 252 and 253 are connected to conductor 185 of the main power supply line. When the armature 257 of the control switch 256 is in neutral position, as indicated by the full lines of operating handle 260, Figure 11, the solenoids of valves 246 and 247 are de-energized and the valves connect the high pressure fluid supply line 187 to the left ends of the pneumatic cylinders 35 and 69. Movement of the control handle 260 of the switch 256 to the left (Fig. 11) throws the armature 257 against a contact 261, to which is connected the conductor 254. Thus is energized the solenoid coil 252 of the valve 246, shifting the latter and admitting high pressure fluid into the left end of the cylinder 35 through the tube 250 so as to shift the piston therein and the rod 36 to the right, the right end of the cylinder being vented to the atmosphere through the conduit 248 and the solenoid valve. This actuation of the air cylinder assembly 35 advances the secondary carriage 22, moving the latter toward the building drum and forcing the lower rubber covered roller 62 against the drum. During this movement of the secondary carriage, air pressure is retained in the cylinder assembly 69 through the right hand supply conduit 249 to hold the piston and the piston rod 72 retracted. Return of the control handle 260 of the switch 256 to the solid line neutral position shown in Fig. 11 interrupts the energizing circuit for the solenoid 252 of the valve 246 and the spring action of the valve returns it to normal position, admitting air or pneumatic fluid into the right hand end of the cylinder assembly 35 through the conduit 248 and exhausting from the left hand end through the conduit 250.

Shifting of the switch control handle 260 to the right (Fig. 11) brings the armature 257 against contacts 262 and 263, energizing the solenoid 252 through the electrical conductor 254 and energizing the solenoid 253 through the electrical conductor 255. The cylinder assembly 35 then functions as before, and simultaneously therewith, the piston and piston rod 72 of the air cylinder 69 are shifted to the right by admission of high pressure air or fluid into the left end of the cylinder through the conduit 251, the right end of the cylinder exhausting to the atmosphere through the conduit or tube 249 and the valve 247.

Movement of the piston rod 72 operates, as previously described, to tilt the feed table head in a clockwise direction (Figs. 2 and 3) to bring the upper rubber covered roller 54 into advanced position in which it is pressed against the building drum 107 by the movement of the secondary carriage 22. This shifting of the operating head on the secondary carriage moves forward the entire feed belt 47 and the ply material P thereon, the springs 52 being compressed at the opposite end of the conveyor sufficiently to accommodate the tilting movement of the operating head. Upon return of the switch 256 to center or neutral position, the solenoids of the control valves 246 and 247 are simultaneously deenergized and the valves, by spring action, are returned to their normal positions in which high pressure fluid or air is introduced into the right ends of the cylinder assemblies 35 and 69 through the conduits 248 and 249, the left ends of the cylinder assemblies exhausting to the atmosphere through the conduits or tubes 250 and 251 and the valves. Desirably, lengths of flexible conduits or tubes, indicated at 264, are interposed in the pneumatic lines or conduits to accommodate relative movement of the parts.

High pressure or other pneumatic fluid is admitted alternatively to the opposite ends of the pneumatic cylinder assembly 122 through a four-way hand operated valve 266 mounted on the table plate 88 of the supporting structure. This is a two-position valve receiving high pressure air from the supply conduit 187. In one position the valve connects the high pressure air supply to the right hand end of the cylinder assembly 122 through the tubular conduit 267. Air thus admitted to the right hand end of the cylinder assembly acts to move the piston rod 129 out of the cylinder and to the left as viewed in Figs. 2, 7 and 11 to draw the tensioning roller 115 downwardly. Air is simultaneously released from the left hand end of the cylinder assembly 122 through a conduit 268 and returned to the valve 266 through which it is exhausted to atmosphere. Movement of the hand valve 266 to its other position connects the conduit 268 to the high pressure supply line 187 admitting air or pneumatic fluid to the left end of the cylinder assembly 122, retracting the piston rod 129, and raising the pressure roller 115 to release the tension in the flexible carrier 10. Air exhausting from the right hand end of the cylinder assembly is returned to the valve through the conduit 267 and released to the atmosphere.

The pneumatic cylinder assembly 178 which actuates the clamping shoe 177 is connected to the pneumatic fluid supply conduit 187 through a four-way foot controlled valve 269. This valve is spring-loaded, normally connecting the fluid supply line to the tubular conduit 182 for maintaining pressure in the cylinder 178 on the underside of the piston to hold the clamping shoe 177 in raised position. By depressing the pedal of the valve 269 the operator connects the conduit 181 to the supply line 187 for admission of the pneumatic fluid or air above the piston, thereby moving the clamping shoe 177 downwardly against the drum to clamp the carrier band 10. The conduits 181 and 182 alternatively are vented to atmosphere through the valve 269.

OPERATION

To build a tire ply band such, for example, as a band of the type having squeegee stock on the inside as well as between the layers of ply material, the operator, after selecting the carrier or endless belt 10 of proper size and tensioning the same about the drum 107 by lowering the pressure roller 115, advances the squeegee stock S to initial position by driving the take-up roller K, using the manual forward drive control button 207 for this purpose. When the movement of the liner H has thus drawn the leading end of the squeegee S onto the roller 93 the squeegee drive is stopped by releasing the control button 207. The operator, whose hand has been resting on the handle 99 of the lever 98 then swings the lever to the left to the position shown in Fig. 7 which presses the end of the squeegee stock adheringly against the carrier 10. If desired, an adhesion inducing agent such as naphtha may be initially applied to the carrier belt or parts thereof to insure sticking of the squeegee. The operator then energizes the drum motor 110 by depressing the forward drive control pedal switch 196 to turn the drum 107 in a clockwise direction as viewed in the drawings and as indicated by the arrows of Fig. 12, applying a layer S-270 of squeegee stock to the flexible carrier belt 10, the length of the squeegee stock band thus applied being predetermined by the carrier belt length. Closing of the foot switch 196, the limit switch 209 also being closed by reason of the advanced position of the sliding rods 94, energizes the relay 221 and the solenoid valve 230 to drivingly connect the squeegee motor 128 to rotate the liner takeup roll K and thereby advance the liner H carrying the squeegee S simultaneously with the driving of the drum 107. This application of a driving force to the squeegee liner H reduces the force transmitted frictionally to the pressure roller 93 and the squeegee liner H through the squeegee stock being applied to the drum and flexible carrier belt. The drive is so arranged that the squeegee motor 128 normally tends to advance the liner H slightly faster than the peripheral speed of the band building carrier 10 on the drum 107. Thus there is a tendency for the drum and carrier to be driven by the squeegee liner H during the squeegee applying process. By reason of the frictional engagement and the pressure between the roller 93 and the drum 107, slippage of the squeegee is prevented and differences in the speeds of the drives are compensated for or accommodated by slippage between the friction coupling discs or plates 138 and 139 (Fig. 9) in the squeegee drive.

The operator stops the drum and squeegee drive by releasing the pedal of the foot switch 196. The parts are then substantially in the relative positions indicated in Fig. 12. With the pressure roller 93 stationary, the operator tilts the lever 105 to advance the heated cutter 102 against the squeegee and thereby sever the latter across the length of the roller 93. With the pressure roller 93 still bearing against the building drum 107, the operator imparts enough rotation to the drum and squeegee take-up roller K, through either the manual or foot control, to move the end of the severed squeegee stock onto the carrier 10, completing squeegee layer or band S-270. The pressure roller 93 is then retracted from the drum 107 by moving the lever 98 to the right to the position indicated in Fig. 8.

With the leading end of the ply material P hanging over the yieldable rollers 54 and 62 of the ply table tilting head, as shown in Figs. 1 through 3 and 6, the operator shifts the hand lever 260 of the control switch 256 to the right hand position shown in Fig. 11, actuating the valve 246 to admit high pressure air or pneumatic fluid to the left of the piston in the cylinder assembly 35 to shift the secondary carriage 22 to the right. The valve 247, also energized through the switch 256 admits pneumatic fluid to the left of the piston in the cylinder assembly 69 rotating the tilting head of the ply table in a clockwise direction as viewed in the figures. The shifting of the carriage and the rotating of the tilting head, occurring simultaneously, move the yieldable roller 54 against the building drum 107, the parts being positioned substantially as represented in Fig. 13. The tackiness of the rubber covered cords of the ply material P causes the latter to adhere to the carrier 10 and to the squeegee stock S on the carrier belt. Through closing of the reverse foot switch 198 the drum motor 110 is then energized to turn the drum 107 in a reverse direction as indicated by the arrows of Fig. 13, this movement of the drum acting by frictional engagement with the ply table belt 47 to move the latter about the rotatable members supporting the same and to advance the ply material P into the bight between the yieldable roller 54 and the drum 107. The pressure between the drum and the roller continuously and progressively tacks the ply material to the flexible carrier 10 and to the squeegee S so that, during continued rotation of the drum 107, the ply material is carried around the path of the flexible carrier belt forming ply layer P-272. The operator, gauging by eye the desired length of the ply material strip thus applied to the carrier 10, stops the drum movement by releasing the foot switch 198 and manually tears ply material P along a diagonal line paralleling the bias cords therein, the tearing being made so as to provide a slight overlap of the ply material ends on the drum 107. The operator manually stitches or adheres the overlapped ends together in forming the customary splice, completing the ply band layer indicated at P-272 (Fig. 14).

After the transfer of ply material stock onto the carrier belt 10 from the ply table belt 47, the ply table carriage 22 is retracted by manual movement of the lever 260 of the control switch 256 to middle or neutral position. With the ply table thus retracted from the drum, squeegee or band S-274 (Fig. 14) is applied about the ply layer P-272 in the same manner and using the same procedure as described in connection with the formation of the squeegee layer S-270.

In assembling bias cut fabric material into multiple ply tire building bands it may be desired to stagger the edges of the successive ply material layers to provide tapered thickness marginal portions about the completed ply bands. The present method and apparatus facilitates the offsetting or staggering of the margins of the ply material. After the transfer of a layer of ply material from the ply table B to the flexible carrier 10 the latter is manually shifted axially on the drum 107 a distance corresponding to the desired offset between the ply material layers. In thus shifting the carrier 10 the operator first releases the tension in the latter by raising the tensioning roller 115 by means of the pneumatic cylinder 122, the control of this movement being effected through the two-position handle of switch 266.

After the shifting of the carrier 10 (and the squeegee stock bands S-270 and S-274, and the ply layer P-272 assembled thereon) the carrier is again tensioned by lowering the roller 115 through the action of the cylinder assembly 122 governed by the two-position hand switch. Prior to the application of additional layers of ply material the stitching roller 164 may be advanced to bear against the drum 107 and the latter rotated to compact and adhere together the squeegee stock and the layer of ply material on the flexible carrier.

A second layer of ply material is placed about the first layer P-272 on the carrier 10 by again advancing the ply table carriage 22, governed by the manual switch 256. This time, however, the lever 260 is shifted to the left hand position shown in Fig. 11 so as to energize only the valve 246 which admits high pressure air behind the piston of the cylinder assembly 35, the carriage thus being advanced with the tilting head lower roller 62 ahead of the upper roller 54 so as to bear against the drum 107 as shown in Fig. 14. The operator then places and adheres the leading end of the ply material strip P on the previously applied layers of squeegee stock and ply material disposed across the top of the drum 107. Rotation of the drum 107 in a forward or clockwise direction, indicated by the arrows of Fig. 14 and as actuated by the drum motor 110 when energized through closing of the foot switch 196, operates to feed the ply material onto the moving carrier 10 from the ply table B. The frictional engagement between the lower roller 62 of the tilting head and the material carried by the drum 107 operates through the gears 64-67 to drive the ply table conveyor belt 47 at the same linear speed as the outer surface of the materials on the drum and carrier belt 10. The operator stops the drum rotation by releasing the foot switch 196 when the ply material P has been carried around the entire circumferential length of the carrier 10, forming a second ply layer P-276 laterally or axially offset or staggered with respect to the first ply layer P-272, as shown in Fig. 16, by reason of the previous lateral shifting of the carrier belt 10 on the drum. The ply material P is thus advanced each time over substantially the same path in moving onto the band building carrier 10, being directed as by the guides 74 and 75. Offsetting of successive layers of ply material is accordingly predetermined by the shifting of the carrier 10 on the drum 107. With the drum stationary, the operator manually tears the ply material P diagonally across that portion of its length still supported on the conveyor belt 74 of the ply table, visually gauging the length to provide the usual overlap which he uses in manually forming the splice overlap across the top of the building drum 107.

After the application of the second ply layer P-276, the carriage 22 of the ply table is retracted by manually returning the switch control lever 260 to neutral position. Another layer S-278 of squeegee stock is placed or wrapped about the layers of ply material by advancing the squeegee applying roller 93 and simultaneously feeding the squeegee stock and rotating the flexible carrier 10 in the manner previously described. Thereafter the several layers of ply material and squeegee stock on the drum and carrier may be compacted and stitched together by advancing the pressure roller 164 and rotating the drum 107.

Fig. 15 illustrates an optional arrangement in which the ply material such as that forming the ply layer P-276 and the squeegee stock such as that forming the layer S-278 can be concurrently applied to the drum and simultaneously stitched in place by the pressure roller 164. This mode of operation reduces the time required to assemble the layers of ply material and squeegee stock on the carrier and is particularly economical in the building of multiple layer ply bands having alternate layers of ply material and squeegee stock. In accordance with this method the ply table B is advanced by drum rotation to a position such as that shown in Fig. 15. The stitching roller 164 is then advanced to contact the layer P-272 behind the leading end of the latter (since it may be desired to raise such leading end of the ply material in later making the splice). The squeegee applying roller 93 is also advanced and the drum motor 110 energized for forward rotation. Energization of the drum motor through the switch 196 also energizes the squeegee drive motor 128 to feed the squeegee S onto the ply material carried by the drum and flexible carrier. The conveyor belt 47 of the ply table B is also actuated by the frictional engagement of the lower roller 62 with the drum to advance the ply material P onto the moving carrier 10. After the ply material and the squeegee stock have thus been simultaneously applied about the carrier 10, the drum is stopped, the ply material P is torn across on the bias, and its ends are overlapped and stitched together. With the squeege pressure roller 93 still bearing against the drum 107 the latter is again rotated to complete the application of the squeegee layer S-278. The squeegee stock is then severed by actuation of the heated knife 102, the pressure roller 93 is retracted and the ply layers are stitched together by rotation of the drum 107 with the stitching roller 164 bearing against the drum.

As many layers of ply material P can be assembled on the carrier and drum as may be desired, optionally separated from one another by one or more layers of the squeegee stock S. Chafer and breaker strips can also be laid up on the carrier from reels or spools mounted on the builder C. Furthermore, the several layers of ply material and squeegee stock can be staggered or offset from one another by axial shifting of the carrier 10 between the successive operations. Rotating the drum and carrier 10 forward and reverse in feeding the ply material layers onto the carrier belt lays the cords of the ply material diagonally across the ply band in crossed relation to the cords of the preceding ply layer.

To remove the completed ply band from the apparatus, the tensioning roller 115 is raised and the carrier 10 shifted, if necessary, under the clamping shoe 177. Actuation of the foot valve 269 then operates to force the clamping shoe against the top of the carrier 10 (which desirably is wider than the ply band built thereon) to grip the carrier against the drum 107. With the flexible carrier 10 thus held in place on the drum, the operator readily separates the now limp or untensioned carrier from the inside of the assembled ply band and lifts the latter from the drum. Thereafter the clamping shoe 177 is raised through release of the foot valve 269, the flexible carrier 10 is tensioned by lowering of the roller 115 and the apparatus is ready for the building of the next ply band.

In accordance with the patent statutes the principles of the present invention may be utilized in various ways, numerous modifications and alterations being contemplated, substitution of parts and changes in construction being resorted to as desired, it being understood that the apparatus shown in the drawings and described above and the particular method set forth are given merely for purposes of explanation and illustration without intending to limit the scope of the claims to the specific details disclosed.

What we claim is:

1. The method of making endless ply bands for use in building pneumatic vehicle tires which comprises supporting a carrier for movement about a closed path of predetermined length, advancing a strip of cord fabric material to the carrier while guiding the advancing strip over a predetermined feed path, securing the strip to the carrier and moving the carrier about the carrier path to lead the strip thereabout and thereby draw a first predetermined length of fabric material onto the carrier, severing the fabric length from the strip and joining the ends thereof to form a first annulus, shifting the carrier and the annulus laterally and simultaneously, similarly drawing a second predetermined length of fabric material onto the carrier and joining the ends thereof to form a second annulus laterally offset from the first, and removing the annuluses from the carrier simultaneously.

2. In the building of tire casings the method of making ply bands on a rotatable support which comprises feeding substantially flat strip cord fabric material over a guided path to the support, forming fed ply material into a first annular ply layer on the support, shifting the support axially to offset the first ply layer supported thereby from the path of the ply material, and thereafter feeding additional ply material over the same path to the support and forming a second annular ply layer on the support in offset relation to the first ply layer.

3. Band building apparatus comprising a substantially cylindrical drum and means mounting the drum for rotation about a substantially horizontal axis so that the top of the drum serves as a work supporting surface, a substantially cylindrical roller of less diameter than the drum and means mounting the roller for rotation about an axis below and parallel to the drum axis and for up and down bodily movement toward and away from the drum, a flexible endless carrier belt trained around the drum and the roller and extending over the major portion of the length of each, means for moving the roller away from the drum to tension the carrier belt and draw the belt against the top work surface of the drum, and stop means limiting such movement of the roller to prevent stretching of the belt beyond a predetermined length whereby the tensioned carrier belt measures ply material wrapped thereabout to predetermined length and the top work surface of the drum supports measured ply material during the splicing of the ends thereof, the tensioned carrier belt being in contact with the major portion of the circumferential extent of the drum surface to provide an upwardly facing work area of belt directly supported by and in contact with the drum surface and substantially co-extensive with the upper half of the drum circumference.

4. Apparatus for building endless bands of alternate layers of ply material and gum rubber stock for use in making cord tire casings comprising a rotatable form and drive means therefor, supply and take up rolls for a flexible liner and a gum rubber strip carried by the liner and means mounting the rolls adjacent the form, guide means for the liner to support the latter between the supply and take up rolls, said guide means including a pressure member and means mounting the same for movement laterally toward and away from the form, means for moving the pressure member against the form to press the guided liner and gum rubber stock carried by the latter against the form, drive means for actuating the take up roll to draw the liner from the supply roll over the guide means and onto the take up roll, and control means effecting simultaneous actuation of the form drive means and the take up roll drive means.

5. In apparatus for building pneumatic cord tire casings, a rotatable form for making ply bands and feed means for supporting continuous strip cord ply material and advancing the same to the form, said feed means comprising a supporting structure, a reciprocable carriage mounted on the structure for movement toward and away from the form, an endless flexible conveyor belt and means mounting the same on the carriage including a rotatable member, and means for advancing and retracting the carriage on the supporting structure to move the rotatable member against the form and thereby establish a frictional drive therebetween to drive the belt and the form in unison and to withdraw the rotatable member from the form to interrupt said drive.

6. In combination in apparatus for building tire casings, a form on which to assemble ply bands and feed means for supporting continuous strip cord ply material and advancing such material to the form, said feed means comprising a supporting structure, a pair of reciprocable carriages mounted one upon the other on the structure for movement toward and away from the form, an endless flexible conveyor belt and means mounting the belt on the one carriage, and means for advancing and retracting the other carriage on the supporting structure for shifting both carriages simultaneously toward and away from the form.

7. In combination in apparatus for building tire casings, a form on which to assemble ply bands and feed means for supporting continuous strip cord ply material and advancing the ply material to the form, said feed means comprising a supporting structure, a first carriage reciprocably mounted on the structure for movement toward and away from the form, a second carriage reciprocably mounted on the first carriage, means for advancing and retracting the first carriage simultaneously to shift the carriages in unison between an operating position adjacent the form and a withdrawn position relatively removed from the form, an endless flexible conveyor belt and means including a rotatable member mounting the belt on the second carriage, and means for shifting the second carriage on the advanced first carriage to move the belt mounting rotatable member toward and away from the band assembly form.

8. In apparatus for building cord ply bands, a rotatable drum and electric drive means therefor, means movable to carry gum rubber stock to the drum and electric drive means therefor, said gum stock carrying means including a member shiftable both toward and away from the drum, and control means for the several drive means, said control means including forward and reverse control means for the drum drive, forward and reverse control means for the gum stock drive, switch means for electrically interlocking the drum drive control means and the gum stock drive control means for simultaneous actuation of the drum and the gum stock carrying means, and means connected to move with the shiftable member for governing the interlocking switch means.

9. In apparatus for building cord ply bands, a rotatable drum and drive means therefor, means movable to carry gum rubber stock to the drum and drive means therefor, said gum stock carrying means including a member shiftable both toward and away from the drum, and control means for the several drive means, said control means including forward and reverse control means for the drum drive, forward and reverse control means for the gum stock drive, means for interlocking the drum drive control means and the gum stock drive control means for simultaneous actuation of the drum and the gum stock carrying means, and means connected to move with the shiftable member for governing the interlocking means, said governing means being arranged upon movement of the shiftable member toward the drum to set the interlocking means for said simultaneous actuation in response to operation of one of the forward and reverse control means.

10. In apparatus for building cord ply bands, a drum rotatable in forward and reverse directions, drive means for actuating the drum alternatively in either direction, gum rubber stock feed means movable in forward and reverse directions, drive means for actuating the gum stock feed means alternatively in either direction to advance and retract gum rubber stock, said gum stock feed means including a member mounted for movement toward and away from the drum, and control means for the drives, said control means including forward and reverse control means for the drum drive means, forward and reverse control means for the gum stock feed drive means, means for interlocking the drum drive control means and the gum stock feed control means for simultaneous forward rotation of the drum and forward movement of the gum stock feed means and for simultaneous reverse rotation of the drum and reverse movement of the gum stock feed means, and means connected to move with said member for governing the interlocking means.

11. In apparatus for building cord ply bands, a drum rotatable in forward and reverse directions, drive means for actuating the drum alternatively in either direction, gum rubber stock feed means movable in forward and reverse directions, drive means for actuating the gum stock feed means alternatively in either direction to advance and retract gum rubber stock, said gum stock feed means including a member mounted for movement toward and away from the drum, and control means for the drives, said control means including forward and reverse control means for the drum drive means, forward and reverse control means for the gum stock feed drive means, means for interlocking the drum drive control means and the gum stock feed control means for simultaneous forward rotation of the drum and forward movement of the gum stock feed means and for simultaneous reverse rotation of the drum and reverse movement of the gum stock feed means, and means connected to move with said member for governing the interlocking means, said governing means being arranged upon movement of said member toward the drum to set the interlocking means for said simultaneous forward and reverse rotation and movement in response to operation of one of the forward and reverse control means.

12. In combination in apparatus for building tire casings a form on which to assemble ply bands and feed means for supporting continuous strip cord ply material and advancing such material to the form, said feed means comprising a supporting structure and a pair of reciprocable carriages, the carriages being mounted one upon the other and the other upon the supporting structure for relative movement and for movement toward and away from the form, an endless conveyor and means mounting the conveyor on the one carriage, and means for advancing and retracting the other carriage on the supporting structure for shifting both carriages simultaneously toward and away from the form.

13. In combination in apparatus for building tire casings, a form on which to assemble ply bands and feed means for supporting continuous strip cord ply material and advancing such material to the form, said feed means comprising a supporting structure and a pair of reciprocable carriages, the carriages being mounted one upon the other and the other upon the supporting structure for relative movement and for movement toward and away from the form, an endless conveyor and means mounting the conveyor on the one carriage, means for advancing and retracting the other carriage on the supporting structure for shifting both carriages simultaneously toward and away from the form, and spaced guides mounted on the one carriage and shiftable therewith for engaging the edges of strip cord ply material and directing such ply material onto the one conveyor.

14. In combination in apparatus for building tire casings, a form on which to assemble ply bands and feed means for supporting continuous strip cord ply material and advancing such material to the form, said feed means comprising a supporting structure and a pair of reciprocable carriages, the carriages being mounted one upon the other and the other upon the supporting structure for relative movement and for movement toward and away from the form, an endless conveyor and means mounting the conveyor on the one carriage, means for advancing and retracting the other carriage on the supporting structure for shifting both carriages simultaneously toward and away from the form, spaced guides mounted on the one carriage and shiftable in unison therewith for engaging the edges of strip cord ply material and directing such ply material onto the one conveyor, and screw means engageable with at least one of the guides for shifting the guides relatively toward and away from one another in adjusting the guides to receive cord ply material strips of different widths.

15. In combination in apparatus for building ply bands, a form on which to assemble the ply bands and feed means for supporting continuous strip cord ply material and advancing such material to the form, said feed means comprising a supporting structure, a carriage reciprocably mounted on the structure for movement toward and away from the form, an endless conveyor and means mounting the conveyor on the carriage for bodily movement of the conveyor with the carriage toward and away from the form, and a pair of spaced guides mounted on the carriage for simultaneous reciprocable movement in unison therewith, said guides being positioned to engage the margins of strip ply material being drawn onto the carriage by the conveyor and to direct such strip material along a predetermined path over the conveyor and carriage.

16. In combination in apparatus for building ply bands, a form on which to assemble the ply bands and feed means for supporting continuous strip cord ply material and advancing such material to the form, said feed means comprising a supporting structure, a carriage reciprocably mounted on the structure for movement toward and away from the form, an endless conveyor and means mounting the conveyor on the carriage for bodily movement of the conveyor with the carriage toward and away from the form, and a pair of spaced guides and means mounting the guides on the carriage for movement in unison therewith, said guides being positioned to engage the margins of strip ply material being drawn onto the carriage by the conveyor and to direct such strip material along a predetermined path over the conveyor and carriage, the guide mounting means including a rotatable screw having connection with at least one of the guides for shifting the guides relatively toward and away from one another to adjust the guides to receive ply material strips of different widths.

17. In combination in apparatus for building ply bands, a form on which to assemble the ply bands and feed means for supporting continuous strip cord ply material and advancing the ply material to the form, said feed means comprising a supporting structure, a first carriage reciprocably mounted on the structure for movement toward and away from the form, a second carriage reciprocably mounted on the first carriage, means having connection with the first carriage to advance and retract the carriages in unison between an operating station adjacent the form and a retracted position relatively removed from the form, an endless conveyor and means mounting the conveyor on the second carriage, and means for shifting the second carriage on the first carriage to move the conveyor relatively toward and away from the form while the carriages are at the operating station.

18. In combination in apparatus for building ply bands, a form on which to assemble the ply bands and feed means for supporting continuous strip cord ply material and advancing the ply material to the form, said feed means comprising a supporting structure, a first carriage reciprocably mounted on the structure for movement toward and away from the form, a second carriage reciprocably mounted on the first carriage, fluid operated means having connection with the first carriage to advance and retract the carriages in unison between an operation station adjacent the form and a retracted position relatively removed from the form, an endless conveyor and means mounting the conveyor on the second carriage, means for shifting the second carriage on the first carriage to move the conveyor relatively toward and away from the form while the carriages are at the operating station, and control means for governing the fluid operated means.

19. In combination in apparatus for building ply bands, a form on which to assemble the ply bands and feed means for supporting continuous strip cord ply material and advancing the ply material to the form, said feed means comprising a supporting structure, a first carriage reciprocably mounted on the structure for movement toward and away from the form, a second carriage reciprocably mounted on the first carriage, fluid operated means having connection with the first carriage to advance and retract the carriages in unison between an operating station adjacent the form and a retracted position relatively removed from the form, an endless conveyor and means mounting the conveyor on the second carriage, fluid operated means for shifting the second carriage on the first carriage to move the conveyor relatively toward and away from the form while the carriages are at the operating station, and control means governing the operation of the several fluid operated means.

20. In combination in apparatus for building ply bands, a form on which to assemble the ply bands and feed means for supporting continuous strip cord ply material and advancing the ply material to the form, said feed means comprising a supporting structure, a first carriage reciprocably mounted on the structure for movement toward and away from the form, a second carriage reciprocably mounted on the first carriage, means having connection with the first carriage to advance and retract the carriages in unison between an operating station adjacent the form and a retracted position relatively removed from the form, an endless conveyor and means mounting the conveyor on the second carriage, fluid operated means for shifting the second carriage on the first carriage to move the conveyor relatively toward and away from the form while the carriages are at the operating station, and control means governing the fluid operated means.

21. In combination in apparatus for building ply bands, a form on which to assemble the ply bands, said form including a rotatable component and means for driving the same, feed means for supporting continuous strip cord ply material and advancing such material to the form, said feed means comprising a supporting structure and a pair of reciprocable carriages mounted one upon the other and the other upon the structure for relative movement and for movement toward and away from the form, an endless flexible conveyor belt and means mounting the belt on the one carriage, means for advancing and retracting the other carriage on the supporting structure for shifting both carriages toward and away from the form, and means for advancing and retracting the one carriage to shift such one carriage and the conveyor mounted thereon toward the form and to move the endless belt to bear against the rotatable component of the form to be frictionally driven thereby.

22. In combination in apparatus for building ply bands, a form on which to assemble the ply bands and feed means for supporting continuous strip cord ply material and advancing the ply material to the form, said feed means comprising a supporting structure, a first carriage reciprocably mounted on the structure for movement toward and away from the form, a second carriage reciprocably mounted on the first carriage, fluid operated means having connection with the first carriage to advance and retract the carriages in unison between an operating station adjacent the form and a retracted position relatively removed from the form, an endless conveyor and means mounting the conveyor on the second carriage, means for shifting the second carriage on the first carriage to move the conveyor relatively toward and away from the form while the carriages are at the operating station, releasable latch means automatically effecting interconnection of the first carriage and the supporting structure upon movement of the first carriage to retracted position to prevent movement of the carriages to the operating station, and control means for governing the fluid operated means.

23. In combination in apparatus for building ply bands of layers of ply material and gun rubber stock, a form comprising a rotatable drum on which to assemble the ply bands, feed means for supporting cord ply material advancing to the form, and means for supporting and advancing to the form gum rubber stock, including a flexible line for carrying the gum stock and supply and take up elements for rolls of the flexible liner, guide means for supporting the liner between the supply and take up elements, said guide means including a pressure member and means mounting the latter for movement toward and away from the form, means for so moving the pressure member including a reciprocable and manually operable lever, electric drive means for the form drum, electric drive means for the supply and take up elements, and control means governing the several electric drives, said control means including forward and reverse elements for the form drum drive and separate forward and reverse elements for the supply and take up drive, said separate forward and reverse elements being disposed adjacent the manual lever at one limit of movement of the latter for manual manipulation of such elements by the same hand of the operator that retains control of such lever.

24. In combination in apparatus for building ply bands, a form comprising a rotatable drum on which to assemble the ply bands, means for driving the drum, and means for supplying, feeding and supporting strip cord ply material, said last named means including ply material supply roll mounting means having a rotatable element for rotating such a supply roll and feeding ply material from the latter, drive means for the rotatable element, an endless conveyor interposed between the mounting means and the drum for receiving and supporting strip ply material, said conveyor being arranged for movement in unison with the drum to feed strip ply material onto the latter, and means automatically governing the rotatable supply element drive to rotate the supply element in accordance with the demand for strip ply material as the latter is fed onto the drum by the conveyor.

25. In combination in apparatus for building ply bands, a form comprising a rotatable drum on which to assemble the ply bands, means for driving the drum, and means for supplying, feeding and supporting strip cord ply material, said last named means including ply material supply roll mounting means having a rotatable element for rotating such a supply roll and feeding ply material from the latter, an endless conveyor interposed between the supply roll element and the drum for receiving and supporting strip ply material, drive means for the rotatable element to feed ply material from a mounted supply roll into a festoon between the mounting means and the conveyor, said conveyor being arranged for movement in unison with the drum to feed strip ply material from the conveyor onto the drum, and photo-electric means responsive to the movement of ply material in such festoon automatically governing the rotatable supply element drive to rotate the supply element in accordance with the demand for strip ply material in the festoon as ply material is fed onto the drum by the conveyor.

26. In combination in apparatus for building ply bands, a form comprising a rotatable drum on which to assemble the ply bands, means for driving the drum, means for supplying feed and supporting strip cord ply material, said last named means including ply material supply roll mounting means having a rotatable element for rotating such a supply roll and feeding ply material from the latter, an endless conveyor interposed between the mounting means and the drum for receiving and supporting strip ply material, said conveyor being arranged for movement in unison with the drum to feed strip ply material onto the latter, means movable to carry gum rubber stock to the form and drive means therefor, means controlling the drum drive means and the gum stock drive for synchronous operation, and means automatically driving the rotatable supply element of the supply roll mounting means to rotate such supply element in accordance with demand for strip ply material as such ply material is drawn onto the drum by rotation of the latter.

27. In combination in apparatus for building ply bands, a form comprising a rotatable drum on which to assemble the ply bands, means for driving the drum, means for supplying feed and supporting strip cord ply material, said last named means including ply material supply roll mounting means having a rotatable element for rotating such a supply roll and feeding ply material from the latter, an endless conveyor interposed between the mounting means and the drum for receiving and supporting strip ply material, said conveyor being shiftable toward and away from the form so as to be movable to bear against the drum to be frictionally driven thereby, means movable to carry gum rubber stock to the form and drive means therefor, means controlling the drum drive means and the gum stock drive for synchronous operation, and means automatically driving the rotatable supply element of the supply roll mounting means to rotate such supply element in accordance with demand for strip ply material as ply material is advanced by the conveyor onto the drum.

28. Band building apparatus comprising cylindrical members mounted for rotation about vertically spaced, substantially parallel axes, an endless, substantially inextensible, flexible carrier tensioned about the members and having top and bottom arcuate runs connected by substantially straight ascending and descending runs, and an endless conveyor for supporting cord ply strip material advancing to the carrier, said conveyor having a discharge end above the axes of the rotatable members and positioned adjacent the uppermost of the cylindrical members to project the leading end of an advancing ply strip onto the top arcuate run of the carrier.

29. In apparatus for building multiple ply rubber reinforced bands for use in the manufacture of pneumatic vehicle tires, a cylindrical drum and means mounting the drum for rotation about a substantially fixed horizontal axis, a cylindrical roller smaller in diameter than the drum and means mounting the roller for rotation about a substantially horizontal axis parallel to the drum axis, the roller mounting means including means for shifting the roller bodily toward and away from the drum, an annular substantially inextensible, flexible carrier band trained about the drum and the roller under tension, said band having an arcuate work area portion directly supported on the top and sides of the drum and extending in substantially continuous contacting relation to the drum more than 180° about the drum circumference, conveyor means having a discharge end located on one side of the drum for supporting strip ply material advancing to the carrier band, said conveyor means including an element at the discharge end mounted for movement toward and away from the drum to provide support for ply material moving directly from the conveyor to a receiving point on the arcuate work area of the carrier band, means on the other side of the drum for carrying gum rubber stock to the carrier band, said last named means including an element mounted for movement toward and away from a transfer point on the arcuate work area of the carrier band spaced circumferentially about the drum from said ply material receiving point, and means for driving the drum to move the carrier band about the drum and the roller in drawing ply material onto the carrier band from the conveyor, the work area of the carrier band between the ply material receiving point and the gum stock transfer point providing an arcuate upwardly directed surface directly over the drum on which to join together the ends of a ply material strip drawn onto carrier band.

30. In apparatus for building multiple ply rubber reinforced bands for use in the manufacture of pneumatic vehicle tires, a cylindrical drum and means mounting the drum for rotation about a substantially fixed horizontal axis, a cylindrical roller smaller in diameter than the drum, means mounting the roller for rotation about a substantially horizontal axis substantially parallel to the drum axis and wholly below the drum, said roller mounting means comprising an arm for carrying the roller and means supporting the arm for swinging movement in an arcuate path about an axis parallel to the drum axis, stop means limiting the swinging movement of the arm to locate the roller in predetermined spaced relation to the drum, an annular substantially inextensible flexible carrier band trained about the drum and the roller under tension providing on the band an arcuate work area directly supported in contacting relation on the top and sides of the drum and extending in substantially continuous contact with the drum more than 180° about the drum circumference, conveyor means having a discharge end located on one side of the drum for supporting strip ply material advancing to the carrier band, said conveyor means including an element at the discharge end mounted for movement toward and away from the drum to provide support for ply material moving directly from the conveyor to a receiving point on the arcuate work area of the carrier band, means on the other side of the drum for carrying gum rubber stock to the carrier band, said last named means including an element mounted for movement toward and away from a transfer point on the arcuate work area of the carrier band spaced circumferentially about the drum from said ply material receiving point, and means for driving the drum to move the carrier band about the drum and the roller in drawing ply material onto the carrier band from the conveyor, the work area of the carrier band between the ply material receiving point and the gum stock transfer point providing an arcuate upwardly directed surface directly over the drum on which to join together the ends of a ply material strip drawn onto the carrier band.

31. Band building apparatus comprising spaced members mounted for rotation about substantially parallel vertically spaced horizontal axes, an endless flexible carrier tensioned about the rotatable members and having arcuate and straight run portions, the arcuate run portions of the carrier being in contact with the rotatable members, an endless conveyor positioned to support cord ply strip material advancing to the tensioned carrier, means for supplying cord ply strip material to one end of the conveyor, the other end of said conveyor extending substantially to one of the arcuate portions of the carrier to provide support for the advancing strip material from said one end of the conveyor substantially continuously to the surface of such one arcuate run portion of the flexible carrier, means movable to carry gum rubber stock to said one arcuate run portion of the flexible carrier, said gum stock carrying means including a member shiftable toward and away from bearing engagement with a point on the said one arcuate run portion of the carrier spaced circumferentially from said endless conveyor to permit simultaneous advancing of cord ply strip material and carrying of gum rubber stock to the same arcuate run portion of the carrier, and means for actuating the carrier to travel about the rotatable members in receiving the cord ply material and the gum rubber stock in superposed relation.

32. In the process of making pneumatic vehicle tires wherein pre-assembled multiple layer ply bands are superimposed on one another about a building form an improved method of assembling a ply band which comprises tensioning an endless substantially inextensible flexible member to provide a carrier of predetermined length for the band, adhering first a layer of tacky uncured gum rubber stock to the tensioned carrier, thereafter placing a layer of cord reinforced rubber ply material about the carrier in superposed adhering relation to the layer of gum stock while maintaining tension in the carrier, releasing the tension in the carrier, and then withdrawing the carrier from within the adhered together gum stock and ply material layers.

33. In the process of making pneumatic vehicle tires wherein pre-assembled multiple layer ply bands are superimposed on one another about a building form an improved method of assembly a ply band which comprises shaping an endless flexible member under tension to predetermined length in the provision of a carrier having connected arcuately curved path portions and straight run path portions connecting the arcuate portions, advancing one end of a strip of cord reinforced rubber ply material directly into adhering contact with one of the arcuately curved path portions of the carrier, moving the carrier about the arcuate and straight run paths to draw the ply material strip thereabout, joining said one end of the ply material strip to another end thereof on said arcuately curved path portion of the carrier to form a ply band of said predetermined length, and withdrawing the carrier from within the ply band.

34. In combination in apparatus for building multiple layer ply bands of cord material and gum rubber stock for use in making pneumatic vehicle tires, a form on which to assemble the ply bands, feed means for supporting cord ply material advancing to the form, and means for supporting and advancing to the form gum rubber stock, including a flexible liner for carrying the gum stock and supply and take-up elements for rolls of the flexible liner, guide means for supporting the liner between the supply and take-up elements, said guide means including a pressure member and means mounting the latter for movement toward and away from the form, means for so moving the pressure member including a manually movable member mounted for limited movement, the form including a rotatable member and drive means for such rotatable member, drive means for the supply and take-up elements, forward and reverse control elements located below the rotatable member for actuation by the foot of the operator for governing the rotatable member drive, and separate forward and reverse control elements for governing the supply and take-up drive, said separate forward and reverse elements being disposed adjacent the manually movable member at one limit of movement of the latter for manual manipulation of such elements by the same hand of the operator that retains control of such lever.

35. In combination in apparatus for building multiple layer cord ply bands for use in making pneumatic vehicle tires, a building form including a rotatable component and means for driving the latter, means for rotatably supporting a roll of cord ply material, means located between the roll support means and the building form for suporting ply material being advanced from the roll to the form, said last named means including a rotatable component and means mounting the latter for bodily shifting movement toward and away from the rotatable component of the building form to carry supported ply material to the form, means for effecting driving of the rotatable component of the material supporting means in unison with the rotatable component of the form, means for drawing ply material from a supported roll and feeding such material to the ply material supporting means, drive means for the drawing and feeding means, and means automatically governing the last named drive means to actuate the drawing and feeding means in accordance with the demand for strip material as the latter is transferred onto the form from the ply material supporting means.

36. In combination in apparatus for building multiple layer cord ply bands for use in making pneumatic vehicle tires, a building form including a rotatable component and means for driving the latter, means for rotatably supporting a roll of cord ply material, means located between the roll support means and the building form for supporting ply material being advanced from the roll to the form, said last named means including a rotatable component and means mounting the latter for bodily shifting movement toward and away from the rotatable component of the building form to carry supported ply material to the form, means for effecting driving of the rotatable component of the material supporting means in unison with the rotatable component of the form, means movable to carry gum rubber stock to the building form and drive means therefore, said gum stock carrying means including a rotatable component movable bodily to bear against a portion of the rotatable component of the form on the opposite side of the latter from the rotatable component of the material supporting means, means for drawing ply material from a supported roll and feeding such material to the ply material supporting means, drive means for the drawing and feeding means, and means automatically governing the last named drive means to actuate the drawing and feeding means in accordance with the demand for strip material as the latter is transferred onto the form from the ply material supporting means.

37. In combination in apparatus for building multiple layer cord ply bands for use in making pneumatic vehicle tires, a building form including a rotatable component and means for driving the latter, means for supporting a supply roll of cord ply material to turn about a substantially horizontal axis on one side of and spaced from the form, means for supporting a supply roll of gum rubber stock to turn about a substantially horizontal axis on the other side of and spaced from the form, means located in the space between the ply roll supporting means and the form for supporting ply material being advanced from the roll to the form, said last named means including a rotatable component and means mounting the latter for bodily shifting movement toward and away from the rotatable component of the building form to carry supported ply material to the form, means for effecting driving of the rotatable component of the material supporting means in unison with the rotatable component of the form, means located in the space between the gum roll supporting means and the form for supporting gum stock being advanced from the roll to the form, said last named means including a rotatable component and means mounting the latter for bodily shifting movement toward and away from the rotatable component of the form to carry supported gum stock to the form, means for effecting driving of the rotatable component of the gum stock supporting means in unison with the rotatable component of the form, means for drawing ply material from a supported roll and feeding such material to the ply material supporting means, drive means for the drawing and feeding means, and means automatically governing the last named drive means to actuate the drawing and feeding means in accordance with the demand for strip material as the latter is transferred onto the form from the ply material supporting means.

38. In apparatus for building multiple layer cord ply bands for use in making pneumatic vehicle tires, a rotatable drum and drive means therefor, means movable to carry gum rubber stock to the drum and drive means for the gum stock carrying means, said gum stock carrying means including a member shiftable both toward and away from the drum, and control means for the several drive means, said control means including forward and reverse control means for the drum drive, forward and reverse control means for the gum stock drive, means for interlocking the drum drive control means and the gum stock drive control means, said interlocking means being arranged to effect simultaneous actuation of the drum and the gum stock carrying means, and means connected to move with the shiftable member for governing the interlocking means.

39. In combination in apparatus for building ply bands, a form on which to assemble the ply bands and feed means for supporting continuous strip cord ply material and advancing the ply material to the form, said feed means comprising a supporting structure, a carriage reciprocably mounted on the structure for movement toward and away from the form, means having connection with the carriage to advance and retract the carriage between an operating station adjacent the form and a retracted position relatively removed from the form, an endless conveyor and means mounting the conveyor on the carriage, latch means automatically effecting interconnection of the carriage and the supporting structure upon movement of the carriage to retracted position to prevent movement of the carriage to the operating station, means actuatable to release the latch means, and control means for governing the advancing and retracting means.

FRED B. CLELAND.
WALTER BARANECKY.
CHESTER R. KOLK.
PAUL E. WETZEL.

REFERENCES CITED

The following references are of record in the file of this patent:

UNITED STATES PATENTS

| Number | Name | Date |
|---|---|---|
| 2,295,541 | Breth | Sept. 15, 1942 |
| 2,313,035 | Breth | Mar. 9, 1943 |
| 2,414,021 | Clark | Jan. 7, 1947 |
| 2,473,067 | Miller | June 14, 1949 |